United States Patent
Mundell et al.

(10) Patent No.: US 11,730,142 B2
(45) Date of Patent: *Aug. 22, 2023

(54) METHOD FOR ACCLIMATING A DOG TO AUTONOMOUS TRAINING SESSIONS WITH A TRAINING APPARATUS

(71) Applicant: Companion Labs, Inc., San Francisco, CA (US)

(72) Inventors: Paul Mundell, San Francisco, CA (US); John Honchariw, San Francisco, CA (US); Camden Olson, San Francisco, CA (US); Noémie Guérin, San Francisco, CA (US); Sayli Benadikar, San Francisco, CA (US)

(73) Assignee: Companion Labs, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/491,075

(22) Filed: Sep. 30, 2021

(65) Prior Publication Data

US 2022/0015334 A1    Jan. 20, 2022

Related U.S. Application Data

(63) Continuation of application No. 16/813,554, filed on Mar. 9, 2020, now Pat. No. 11,160,253.

(Continued)

(51) Int. Cl.
*G08B 21/00* (2006.01)
*A01K 15/02* (2006.01)
(Continued)

(52) U.S. Cl.
CPC .......... *A01K 15/021* (2013.01); *A01K 5/0114* (2013.01); *A01K 5/0291* (2013.01);
(Continued)

(58) Field of Classification Search
CPC .. A01K 15/021; A01K 5/0114; A01K 5/0291; A01K 29/005; G06F 3/167; G06T 7/20; G06V 40/10; G06V 20/52
(Continued)

(56) References Cited

U.S. PATENT DOCUMENTS

2006/0011144 A1* 1/2006 Kates .................. G01S 15/86
                                                        119/859
2010/0095896 A1* 4/2010 Van Wye .............. A01K 15/02
                                                        221/9

(Continued)

*Primary Examiner* — Mark S Rushing
(74) *Attorney, Agent, or Firm* — Run8 Patent Group, LLC; Peter Miller; Leah Raddatz

(57) ABSTRACT

One variation of a method for acclimating a dog to autonomous training with a training apparatus, includes: accessing a video feed of a working field; dispensing a first set of treats into the working field at a first frequency and outputting an audible reinforcer at a first volume level; estimating a first acclimation score representative of acclimation to dispensation of the first set of treats; in response to the first acclimation score exceeding a threshold acclimation, dispensing a second set of treats at a second frequency less than the first frequency and outputting the audible reinforcer at a second volume greater than the first volume; estimating a second acclimation score responsive to the second set of treats; in response to the second acclimation score exceeding the threshold acclimation, the second frequency falling below a threshold frequency, and the second volume exceeding a threshold volume, verifying acclimation of the dog.

20 Claims, 7 Drawing Sheets

Related U.S. Application Data

(60) Provisional application No. 62/815,360, filed on Mar. 8, 2019.

(51) Int. Cl.
*A01K 29/00* (2006.01)
*A01K 5/02* (2006.01)
*G06T 7/20* (2017.01)
*G06F 3/16* (2006.01)
*A01K 5/01* (2006.01)
*G06V 40/10* (2022.01)

(52) U.S. Cl.
CPC ............ *A01K 29/005* (2013.01); *G06F 3/167* (2013.01); *G06T 7/20* (2013.01); *G06V 40/10* (2022.01)

(58) Field of Classification Search
USPC ....................................................... 340/573.3
See application file for complete search history.

(56) References Cited

U.S. PATENT DOCUMENTS

2013/0319338 A1* 12/2013 Davis .................... A01K 15/02
119/57.1
2016/0316716 A1* 11/2016 Hanson .................... A01K 5/02

* cited by examiner

METHOD FOR ACCLIMATING A DOG TO AUTONOMOUS TRAINING SESSIONS WITH A TRAINING APPARATUS

CROSS-REFERENCE TO RELATED APPLICATIONS

This Application is a continuation application of U.S. patent application Ser. No. 16/813,554 filed on 9 Mar. 2020, which claims the benefit of U.S. Provisional Application No. 62/815,360, filed on 8 Mar. 2019, which is incorporated in its entirety by this reference.

TECHNICAL FIELD

This invention relates generally to the field of animal training and more specifically to a new and useful method for acclimating a dog to autonomous training sessions with a training apparatus in the field of animal training.

DESCRIPTION OF THE EMBODIMENTS

The following description of embodiments of the invention is not intended to limit the invention to these embodiments but rather to enable a person skilled in the art to make and use this invention. Variations, configurations, implementations, example implementations, and examples described herein are optional and are not exclusive to the variations, configurations, implementations, example implementations, and examples they describe. The invention described herein can include any and all permutations of these variations, configurations, implementations, example implementations, and examples.

1. Method

Figure 1A:
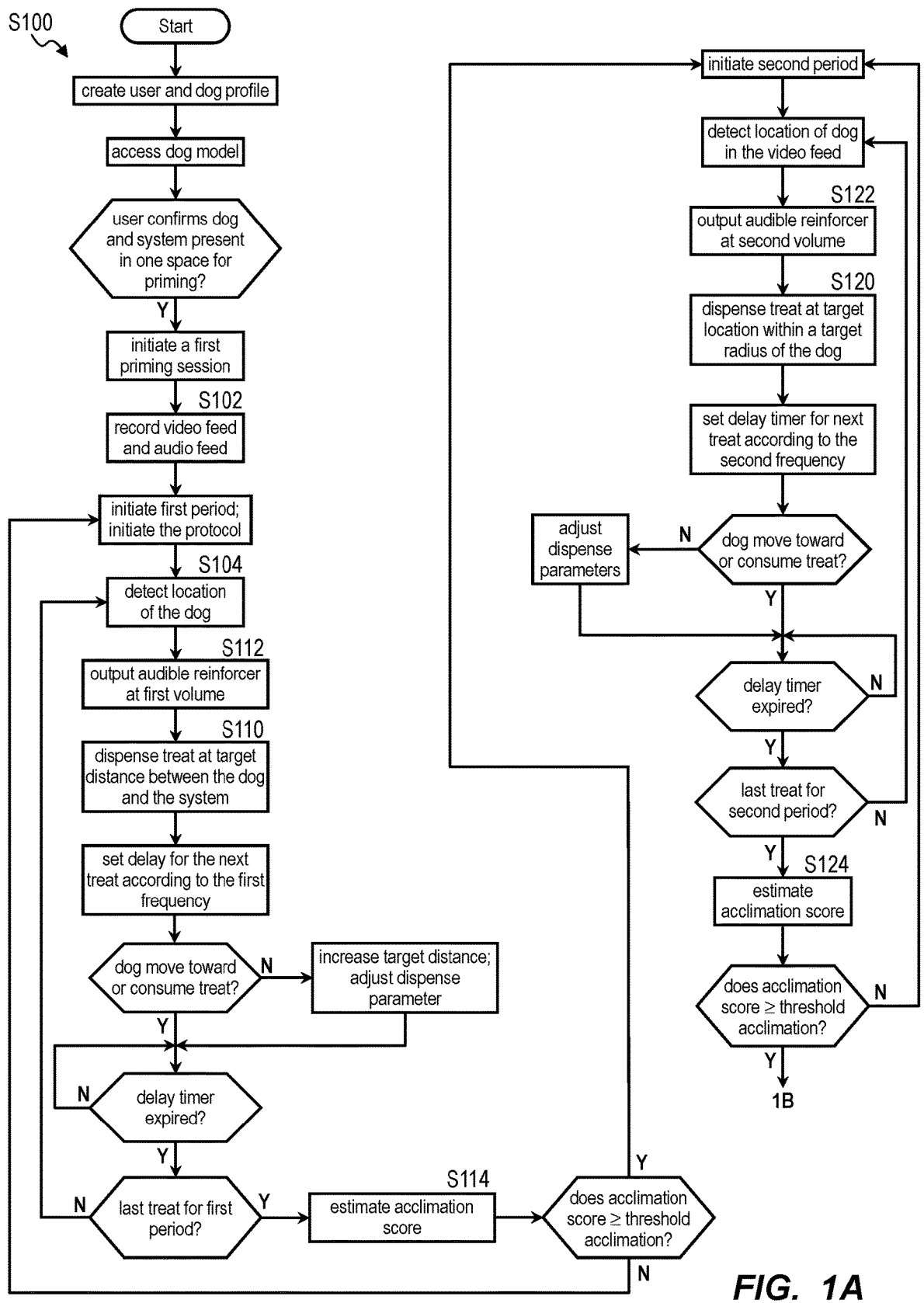
FIGS. 1A and 1B are flowchart representations of a method.
Figure 1B:
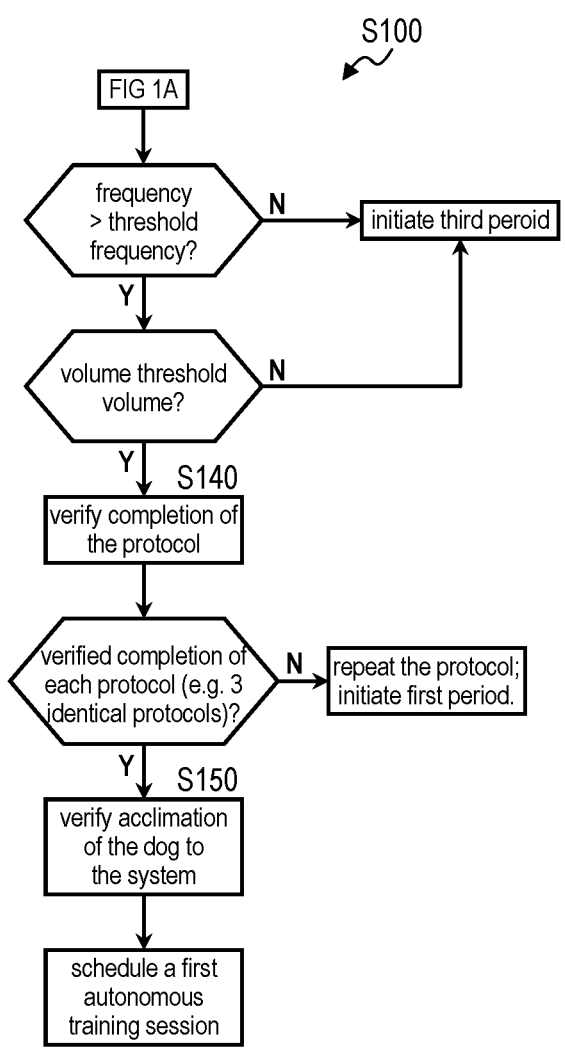

As shown in FIGS. 1A and 1B, a method S100 for acclimating a dog to autonomous training sessions with a training apparatus includes: during a first priming session, accessing a video feed of a working field adjacent the training apparatus via an optical system integrated into the training apparatus in Block S102; detecting the dog in the video feed in Block S104; and, during a first period of the first priming session, initiating a first priming protocol in a set of priming protocols including dispensing a first set of primary reinforcers into the working field at frequencies within a first range of frequencies via a dispenser integrated into the training apparatus in Block S110 and outputting an audible reinforcer at a first volume level approximately concurrent with dispensation of the first set of primary reinforcers in Block S112; estimating a first acclimation score representing acclimation to dispensation of the first set of primary reinforcers based on motion of the dog detected in the video feed during the first period of the first priming session in Block S114; during a second period of the first priming session, in response to the first acclimation score exceeding a threshold acclimation, dispensing a second set of primary reinforcers into the working field at frequencies within a second range of frequencies less than the first range of frequencies in Block S120 and outputting the audible reinforcer at a second volume greater than the first volume and approximately concurrently with dispensation of the second set of primary reinforcers in Block S122; estimating a second acclimation score based on motion of the dog detected in the video feed during the second period of the first priming session in Block S124. The method S100 further includes, in response to the second acclimation score exceeding the threshold acclimation, the second range of frequencies falling below a threshold frequency, and the second volume exceeding a threshold volume, verifying completion of the first priming protocol in Block S140; and, in response to verifying completion of each priming protocol in the set of priming protocols, verifying acclimation of the dog to the training apparatus in Block S150.

Figure 2:
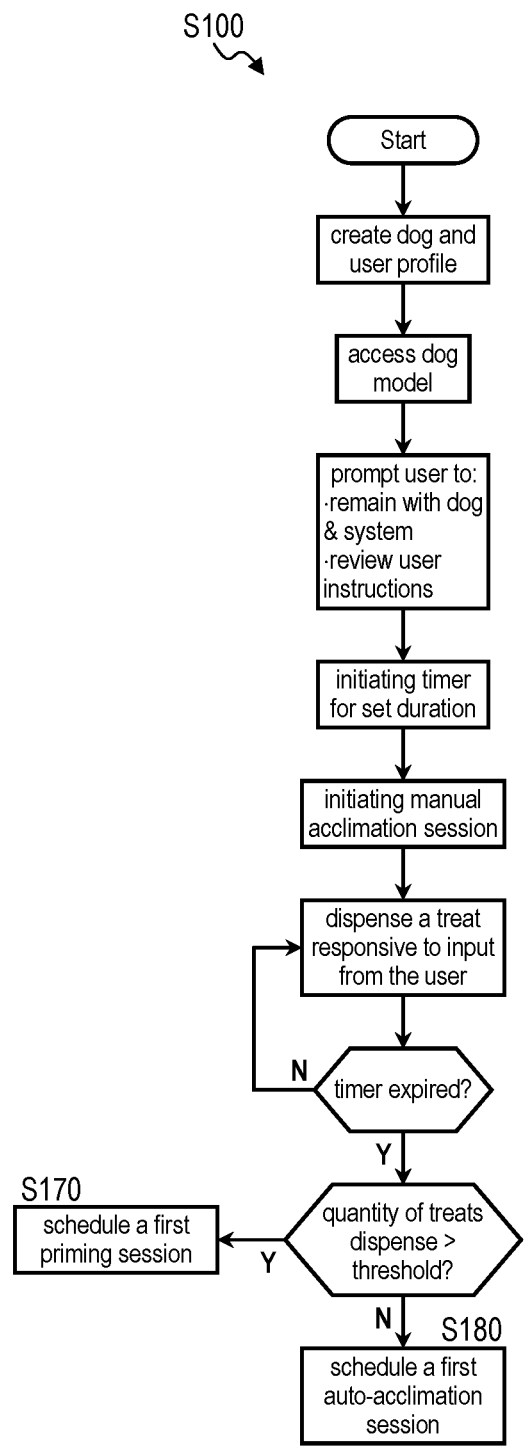
FIG. 2 is a flowchart representation of one variation of the method.
Figure 4:
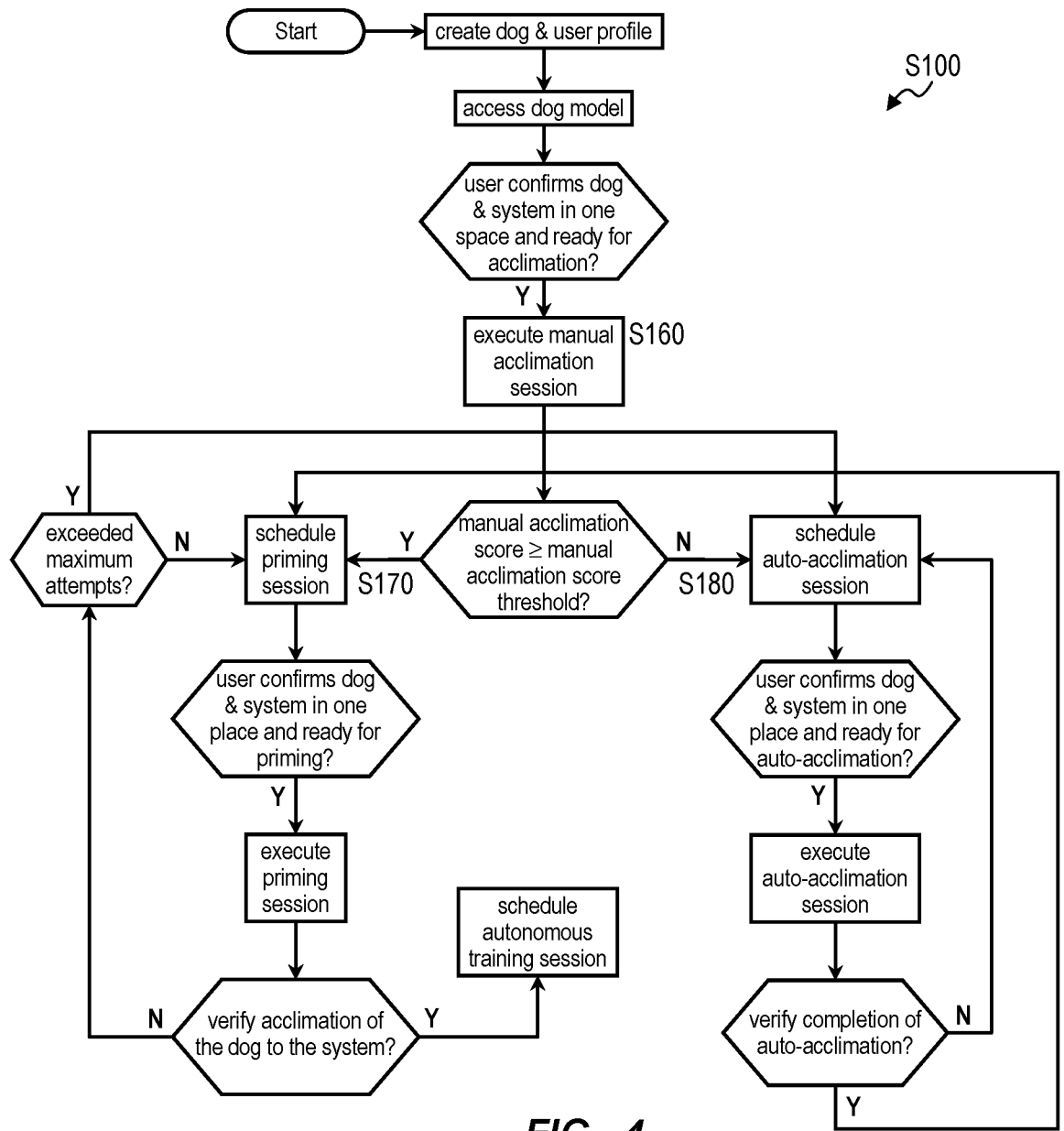
FIG. 4 is a flowchart representation of one variation of the method.
Figure 5:
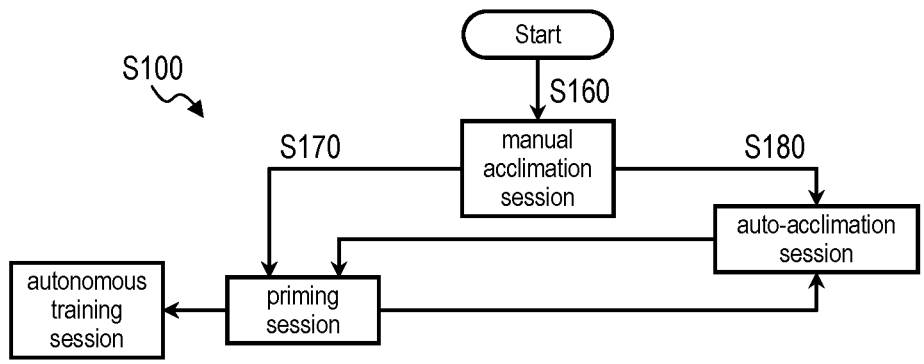
FIG. 5 is a flowchart representation of one variation of the method.

In one variation, as shown in FIGS. 2, 4 and 5, the method S100 further includes during a first period of time preceding the first priming session, executing a manual acclimation session in Block S160, including: prompting a user to remain in a space with the dog and the training apparatus; and prompting the user to review a set of user instructions to train the user for participation in a first manual acclimation session; initiating a timer for a set duration; at a first time during the manual acclimation session, in response to receiving a first input from the user, enabling a first dispensation of primary reinforcer into the working field; at a second time, in response to receiving a second input from the user, enabling a second dispensation of primary reinforcer into the working field, the second time offset from the first time by a first duration; and, at a third time, in response to receiving a third input from the user, enabling a third dispensation of primary reinforcer into the working field, the third time offset from the second time by a second duration, the second duration less than the first duration; at a fourth time, in response to expiration of the timer, terminating the first manual acclimation session; extracting a number of user inputs comprising the first input, the second input, and the third input; calculating a manual acclimation score for the dog during the first manual acclimation session based on the number of user inputs; in response to the manual acclimation score exceeding a manual acclimation threshold, scheduling the first priming session in Block S170; and, in response to the manual acclimation session score falling below the manual acclimation threshold, scheduling a first auto-acclimation session in Block S180.

Figure 6A:
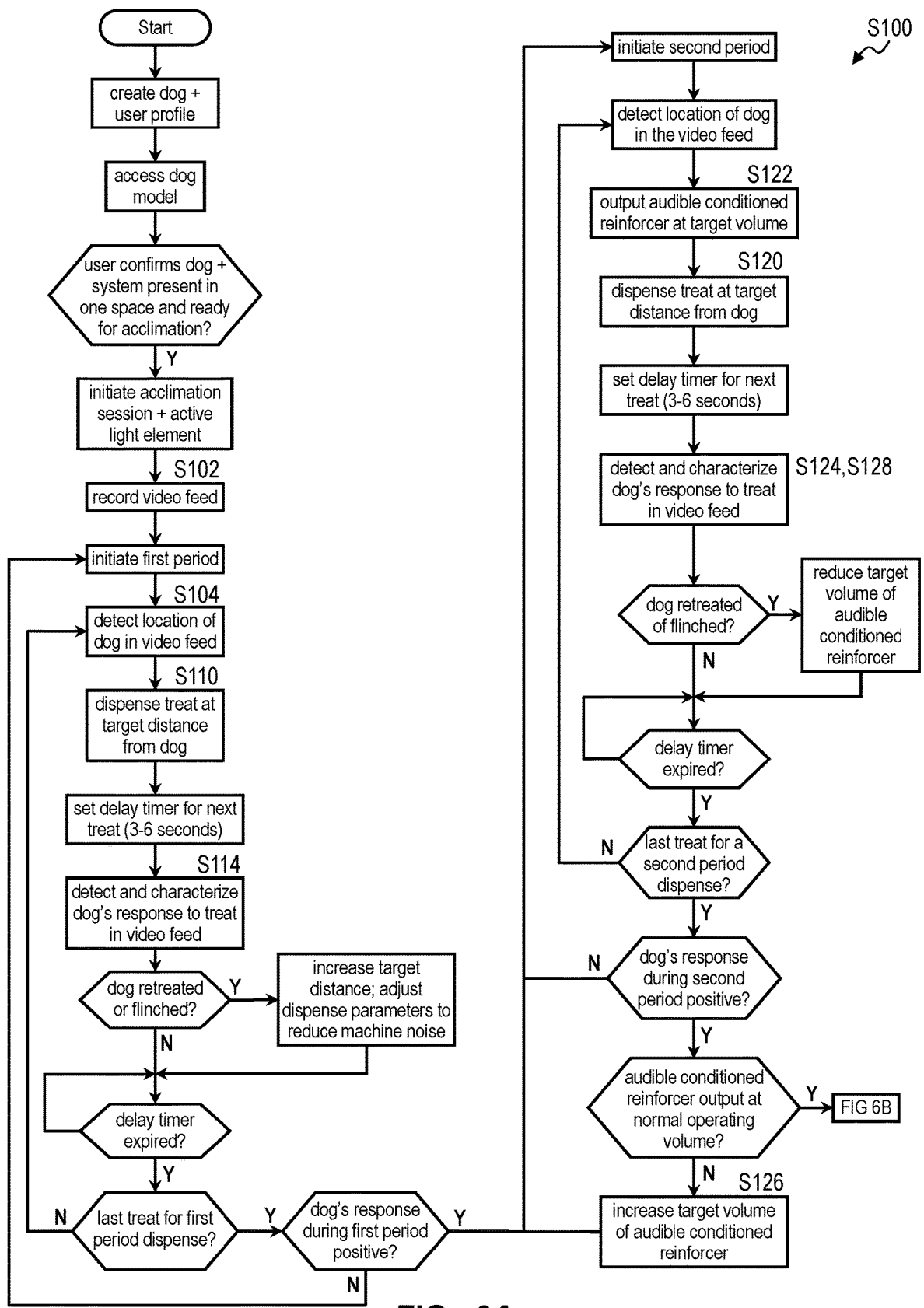
FIGS. 6A and 6B are flowchart representations of one variation of the method.
Figure 6B:
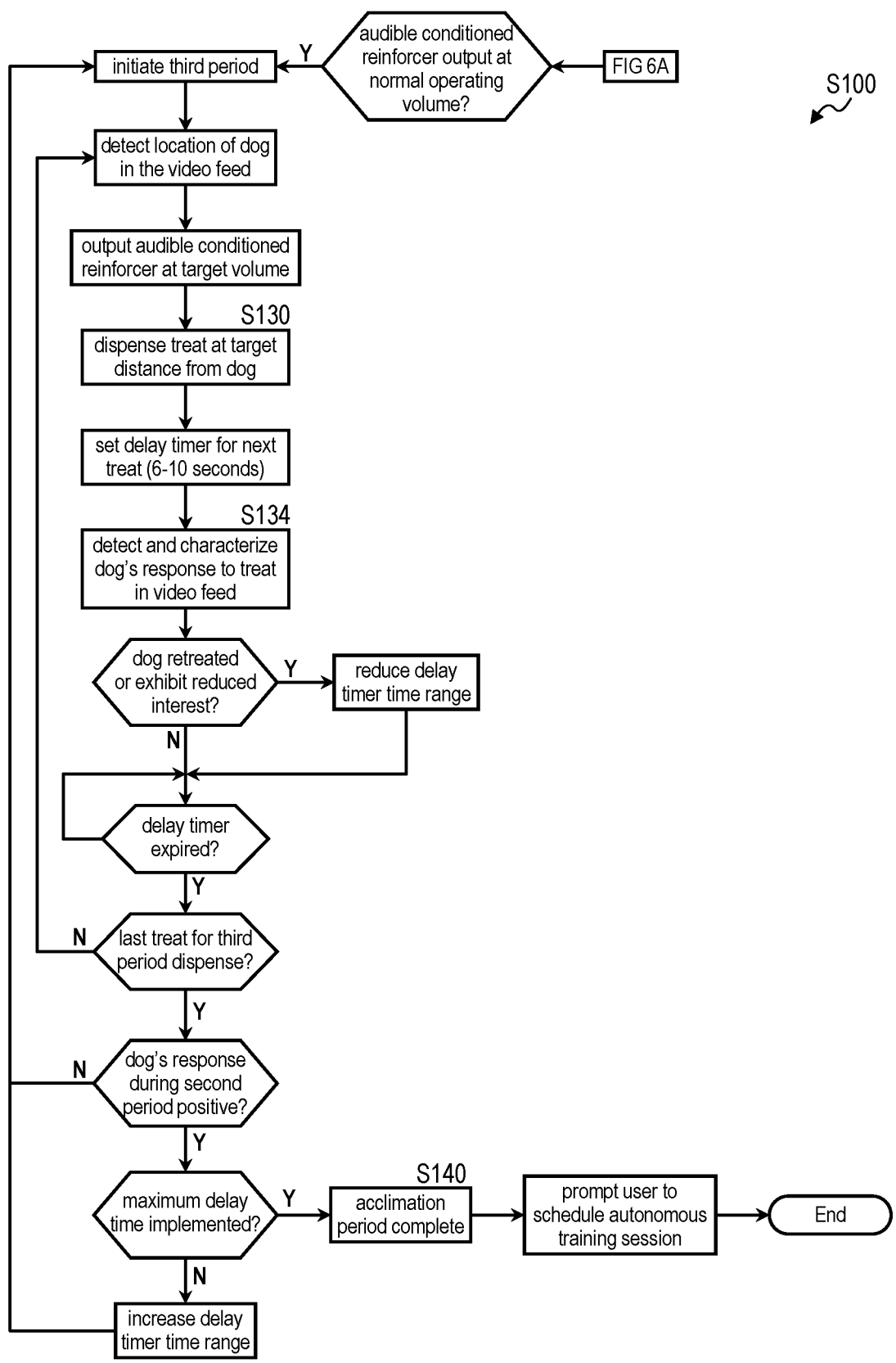

In one variation, as shown in FIGS. 6A and 6B, the method S100 for acclimating a dog to autonomous training sessions with a training apparatus includes: during a priming session, accessing a video feed of a working field adjacent the training apparatus via an optical sensor integrated into the training apparatus in Block S102; detecting the dog in the video feed in Block S104; during a first period of the priming session, dispensing a first set of treats into the working field at a first frequency via a dispenser integrated into the training apparatus in Block S110; characterizing response of the dog to dispensation of the first set of treats based on motion of the dog detected in the video feed during the first period of the priming session in Block S114; during a second period of the priming session and in response to the dog exhibiting less than a threshold caution during dispensation of the first set of treats, dispensing a second set of treats into the working field in Block S120 and outputting an audible conditioned reinforcer at a first volume level approximately concurrently with dispensation of the second set of treats in Block S122; characterizing response of the dog to dispensation of the second set of treats and the audible conditioned reinforcer based on motion of the dog detected in the video feed during the second period of the priming session in Block S124; in response to the dog exhibiting less than the threshold caution during dispensation of the third set of treats, repeating the second period of the priming session with the audible conditioned reinforcer output at a second volume level greater than the first volume level approximately concurrent with dispensation of a third set of treats in Block S126; characterizing response of the dog to dispensation of the third set of treats and the audible conditioned reinforcer based on motion of the dog detected in the video feed during the priming session in Block S128; during a third period of the priming session and in response to the dog exhibiting less than the threshold caution during dispensation of the third set of treats, dispensing a fourth set of treats into the working field at a second frequency less than the first frequency and with the audible conditioned reinforcer at a third volume level greater than the second volume level approximately concurrently with dispensation of the treats in Block S130; characterizing response of the dog to dispensation of the fourth set of treats based on motion of the dog detected in the video feed during the third period of the priming session in Block S134; and, in response to the dog exhibiting more than a threshold interest in the fourth set of treats, verifying acclimation of the dog to the training apparatus in Block S150.

2. Applications

Generally, Blocks of the method S100 can be executed by or in conjunction with a training apparatus (hereinafter the "system") to automatically and responsively acclimate a dog to the system in preparation for autonomous training of the dog by the system without the dog's owner or caregiver (hereinafter the "user") present. In particular, the system can include: a color camera or other optical sensor; a microphone or other audio sensor; a reservoir configured to store treats (or kibble, dog toys, or other unconditioned reinforcer); a dispensing subsystem configured to eject individual treat units into a working field nearby; a loader configured to load treat units from the reservoir into the dispensing subsystem; a speaker configured to output an audible conditioned reinforcer; and a light element (or other display) configured to visually indicate the status of the system.

In one example, when a user first receives and unpackages the system, the user may place the system in a room and activate the system, such as by interfacing with the system directly or through a native dog training application executing on her smartphone (or web interface on another personal or mobile computer, etc.). Once active, the system can initiate an acclimation session (or "priming session") to verify that the user's dog is comfortable with the system and prepared for autonomous training with the system. In particular, the system (or the native dog training application) can: prompt the user to bring the dog into the room with the system and remain with the dog in this room; access a video feed through the camera (and an audio feed via the microphone); track and monitor the dog in this video feed; dispense treats (e.g., an "unconditioned reinforcer") in quick succession into the working field for the dog; and characterize the dog's response to these treats during a first period of this priming session based on the video and audio feeds. If the dog exhibits shyness, flinches, retreats from the system, vocalizes, or otherwise exhibits discomfort during this first period, the system can repeat this first period but under different parameters that may yield less discomfort for the dog, such as: dispensing treats further away from the dog and/or at lower velocity to reduce perception of these treats as invasive; dispensing treats more slowly and/or at lower velocity in order to reduce machine noise generated by the system; or dispensing treats with the user closer to the dog.

Once the system predicts—from the video and/or audio feeds—that the dog has reached a reasonable degree of comfort with the system (e.g., minimal flinching, minimal retreat when a treat is dispensed) during this first period, the system can transition into a second period of the priming session, including: continuing to record the video and audio feeds; tracking and monitoring the dog in these video and audio feeds; dispensing a second set of treats and outputting an audible conditioned reinforcer at a low volume approximately simultaneously and in quick succession; and characterizing the dog's response to these treats based on the video and audio feeds during this second period of this priming session. If the system then determines that the dog exhibits shyness, flinches, retreats from the system, vocalizes, or otherwise exhibits discomfort when a treat or the audible conditioned reinforcer is output during this second period, the system can repeat this second period of the priming session but under different parameters that may yield less discomfort for the dog, such as described above and/or by reducing the volume of the conditioned reinforcer output concurrently with these treats.

However, if the system deduces—from the video and audio feeds—that the dog has reached a reasonable degree of comfort with the system during this second period, the system can repeat the second period with the volume of the conditioned reinforcer increased to a higher operating volume.

Once the system determines—from the video and audio feeds—that the dog continues to be or has gained sufficient comfort with the system during this second period of the priming session, the system can: continue to record the video and audio feeds; track and monitor the dog in these video and audio feeds; dispense a third set of treats (and simultaneously output the audible conditioned reinforcer at normal operating volume) with a longer interval between consecutive treats in order to condition the dog to engage with the system over longer durations of time.

Once the system has thus developed and verified the dog's comfort with the system and conditioned the dog to engage with the system over longer periods of time (e.g., by reaching a threshold duration between discharges and a threshold volume level for the audible reinforcer), the system can indicate to the user—either directly or via the native dog training application—that the dog is ready for autonomous training without the user present.

Therefore, this system (and/or a remote computer system, such as a remote server, or a mobile computing device associated with the user) can execute Blocks of the method S100 to acclimate a dog to stimuli output by the training apparatus, including audible outputs and treats, and to develop the dog's interest in the training apparatus in preparation for the system autonomously executing subsequent training sessions with the dog without the user present.

The method S100 is described herein as executable by the system to acclimate a dog to training sessions with the system. However, the method S100 can be executed by the system to acclimate an animal of any other type (e.g., a cat, a bird) to training sessions with system.

The system can repeat priming sessions to further: reinforce target (or "desired") behaviors of the dog (e.g., remaining in the working field, moving toward treats, absence of barking); reinforce association between the system and dispensation of treats for the dog; increase comfort of dog with the system throughout these priming sessions; increase speed to complete priming protocols; and/or prepare the dog for future autonomous training sessions.

3. System

Figure 7:
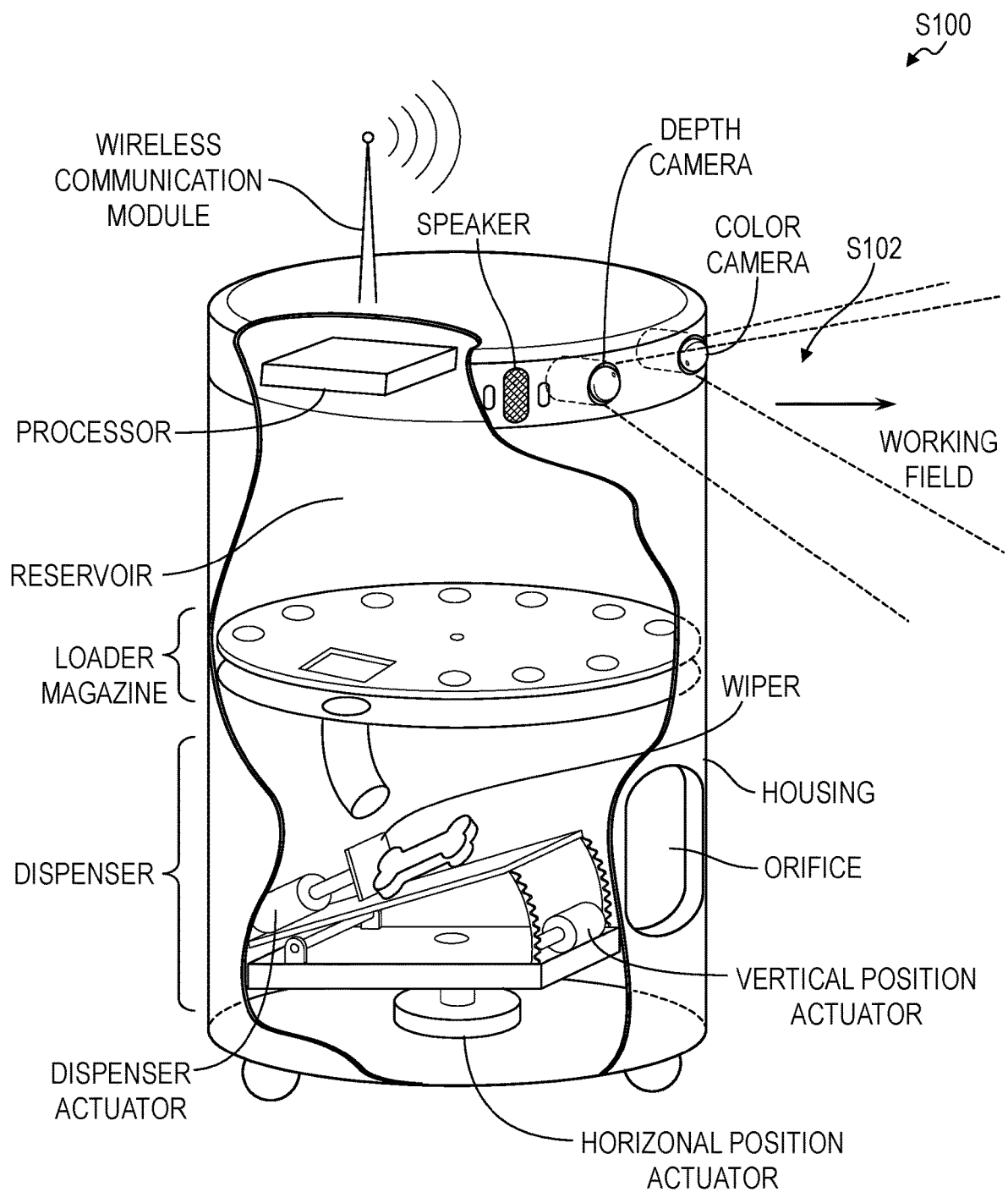
FIG. 7 is a representation of one variation of the method.

As shown in FIG. 7, the system (or "training apparatus") can include: a suite of optical sensors configured to record images (e.g., color and/or depth images) of a working field ahead of the system; audio sensors configured to record ambient noise and animal vocalizations within the working field around the system; a speaker configured to output audible cues; a wireless communication module configured to download data and/or an animal model from a remote database or local computing device; a treat reservoir configured to store units of a treat, such as loose treats or treats in a magazine; a dispenser configured to eject treats into the working field; a loader configured to load individual treat units from the reservoir into the dispenser; a processor configured to interpret positions and poses of an animal in the working field in (near) real-time from images recorded by the suite of optical sensors, to move the dispenser into axial alignment with the dog as the dog moves through the working field, and to selectively trigger the dispenser to eject a treat unit toward or near the dog; and a housing containing these elements.

4. Initialization and Dog Profile

The system can interface with a native application or web application—executing on a user's computing device—to initiate a priming session with a dog and to later configure a series of training protocols for the dog. For example, once the system is received by the user, the user can download the native application to her smartphone and connect her smartphone to the system, such as by: wirelessly pairing her smartphone to the system; scanning a QR code arranged on the system to register the system to her smartphone; or by manually entering into the native application a unique code arranged on the system or product packaging.

Once the system is registered and connected to the user's smartphone, the user can create a new profile for her dog within the native application and manually populate the new profile with various information, such as: a name; age; breed; size; and/or primary colors of the dog's coat (e.g., black for a black Labrador or reddish-brown for a redbone coonhound). This new profile can be stored in a remote database, and the native application can upload these data to the new profile via the Internet. Alternatively, the system can extract or derive these dog characteristics directly from a video feed recorded during a first priming session or manual acclimation session with the dog and then populate the profile for the dog with these characteristics accordingly.

4.1 Oral Commands

Once a new profile is thus created for the user's dog, the native application can prompt the user to recite various oral commands for the dog and record these oral commands. For example, the native application can prompt the user to orally recite her preferred forms of various oral commands including: "yes"; "no"; "watch me"; "sit"; "down"; "stand"; "stay"; "heel"; "wait"; "come"; "drop it"; and/or "crate"; etc. During this setup process, the native application can: record a discrete soundbite as the user recites each of these oral commands and a name of her dog; and tag each of these soundbites with a tag for the corresponding command or pet name. The native application can then upload these tagged soundbites to the system (e.g., directly to a remote database or server via a local ad hoc wireless network), and the system can store these soundbites as conditioned reinforcers—one, some, or all of which the system outputs at varying volume levels during periods of a priming session as described below.

4.2 Visual Animal Characteristics

In one variation, the native application also collects information related to visual characteristics of the user's dog. The system can then leverage these data to select or tune a dog model to reduce a speed and increase an accuracy with which the system implements the dog model to detect presence, locations, and poses of the user's dog in the working field, thereby reducing latency and false positive training events and enabling the dog to make more accurate associations between commands and poses even more quickly.

In one implementation, the native application prompts the user to record an image of her dog or to select an existing image of her dog stored on her smartphone. Alternatively, the native application can prompt the user to place her dog in front of the system and then trigger the system to record an image of the dog. Once an existing image of the dog is selected by the user or once a new image of the dog is recorded at the smartphone or system, the native application can render the image on a screen of the smartphone and prompt the user to manually indicate the dog in the image, such as by manually drawing a box, drawing a perimeter, or otherwise manually highlighting the dog in the image. Alternatively, the native application can: implement computer vision techniques to detect a dog in the image (or to detect pixels in the image likely to represent a "dog" or an "animal" more generally); render the image on a display of the user's smartphone; highlight a contiguous cluster of pixels likely to represent a dog; and then prompt the user to confirm that these pixels represent the user's dog or to adjust this highlighted area to better encompass the dog shown in this image. For example, the native application can implement a generic animal model—similar or identical to a dog model implemented by the system—to predict a location of a dog in the image, prompt the user to confirm that the native application's prediction is correct or to manually modify this prediction, and then return the image and these feedback to a remote computer system, which can then retrain the generic animal model or train a custom animal model for the user's dog based on these feedback provided by the user.

In another example, the native application (or a remote computer system) can: extract visual characteristics of the dog from the image selected by the user, such as by extracting frequencies (e.g., rates of recurrence, a histogram) of colors present in a region of the image confirmed by the user as representing the dog; and then write to the dog's profile up to three distinct, highest-frequency colors extracted from this region of the image. The system (or the remote computer system) can then tune a dog model to detect the dog in a color image—recorded by the color camera during a subsequent priming session and later training protocol—based on these highest-frequency colors more representative of the dog's coat.

The native application (or the remote computer system) can also estimate a size of the dog from the image selected by the user or otherwise prompt the user to indicate a size of the dog, such as in length or height dimensions or in weight, and then store this size value in the dog's profile. The system (or the remote computer system) can then tune a dog model to detect the dog in a depth image—recorded by the depth camera during a subsequent priming session—based on a size of the dog.

Similarly, the native application (or the remote computer system) can implement computer system techniques to extract geometries of the dog from the image selected by the user or otherwise prompt the user to enter additional characteristics of her dog, such as whether the dog has: short or long legs; a short or long torso; a round or tapered torso; a tail or no tail; a short or long nose; a short or long coat; natural or cropped ears; and/or a small or large ratio of height to length; etc. The system (or the remote computer system) can then tune a dog model to detect the dog in color and/or depth images—recorded by the suite of optical sensors during a subsequent priming session—based on a combination of such characteristics of the dog.

(Alternatively, the system can implement any of the foregoing processes locally to initialize a new profile for the user's dog, to aggregate soundbites of the user reciting various commands, and to aggregate features or characteristics of the dog, etc. via a user interface integrated in the system.)

5. Animal Model

In one variation, prior to a first priming session with the dog, the system can: query a remote database for a dog presence and pose detection model trained on images of dogs of an age, breed, size, shape, and/or coat length, etc. that are the same or similar to characteristics stored in the dog's profile; and then download this animal model from the remote database, such as over the internet or via the user's smartphone or tablet. Similarly, the native application, the system, and/or the remote computer system can: tune a generic animal model based on various characteristics stored in the dog profile; or select one animal model—from a corpus of existing animal models—developed to detect presence and pose of dogs exhibiting various characteristics similar to those of the dog. The system can then implement a local copy of this animal model to rapidly detect presence (i.e., location and orientation) and pose of the dog in images recorded by the system during a subsequent priming session with the dog. By accessing a dog model "tuned" to detecting presence and pose of animals exhibiting characteristics similar to those aggregated into the dog's profile during setup, the system may detect the presence and orientation of the dog in the working field more quickly and with increased confidence.

Alternatively, the system can implement a generic animal model to detect the presence and orientation of the dog in the working field, such as if limited information about the dog is provided by the user during setup.

6. Priming Session Initialization

Once the system has accessed the foregoing data, the system (or the native dog training application, etc.) can prompt the user to locate the dog and the system in a common space in preparation for a first priming session. Once the user confirms that she and the dog are ready for the first priming session, the system can: initialize the first priming session; begin recording a video feed of the working field near the system in Block S102; and implement the dog model described above to detect the dog and track its motion and pose in the video feed in Block S104.

In one variation described below, the system can interface with the user to complete a manual acclimation session before initializing the first priming session with the dog. In this variation, the system can prompt the user to locate the dog and the training apparatus in a common space in preparation for a first priming session following completion of the first manual acclimation session. Therefore, in this variation, the system can prepare the dog for the first priming session and reduce probability of failure (e.g., the dog exhibiting discomfort with the system) or incompletion of the first priming session by initializing the first priming session only after the system confirms that the dog displays a minimum comfort with the training apparatus during the manual acclimation session and/or other prior acclimation session.

7. First Period: Introduction and Unconditioned Reinforcer

Block S110 of the method S100 recites, during a first period of the priming session, dispensing a first set of treats into the working field at frequencies within a first range of frequencies via a dispenser integrated into the system. Generally, in Block S110, the system can introduce the dog to the system and develop the dog's perception that the system dispenses positive reward by dispensing treats for the dog without regard to the dog's response to this action. In particular, during the first period, the system dispenses a first set of treats (e.g., five treat units, the "unconditioned reinforcer") into the working field for consumption by the dog in order to train the dog to associate receipt of a reward (i.e., a treat) with the system.

In one implementation, the system rapidly dispenses the first set of treats in its entirety—according to a schema described below—within a short period of time (e.g., less than eight seconds). For example, the system can dispense the first set of treats: clustered at the dog's feet, as detected in the video feed; dispersed throughout room but not toward the dog in order to limit the dog's perception of the system as threatening; in a cluster approximately halfway between the system and the dog; in a cluster between one meter and two meters from the front and/or sides of the dog in order to ensure that the dog notices the treats; dispersed within a semicircular zone defined by a one-meter radius with its origin at the dog's location and extending between the dog and the system (i.e., not behind the dog); or in a line (e.g., a row, a column) of treats with subsequent treats landing at decreasing distances from the system in order to draw the dog toward the system as the dog consumes these treats.

The system can also output an audible reinforcer approximately concurrently with dispensation of the first set of treats in Block S114. In one implementation, during the first period, the system outputs this audible reinforcer at a relatively low volume to increase the dog's focus on treat consumption while minimally introducing the audible reinforcer. For example, the system can dispense treats every three to six seconds and output an audible reinforcer—such as an audio recording of a cheerful or exuberant human voice (e.g., a generic human voice or a recording of the user herself) saying "yes!"—at a low volume (e.g., ten decibels) immediately preceding each treat dispensed into the working field. Therefore, the system quietly outputs the audible reinforcer while dispensing treats at a high frequency, in order to introduce the dog to the audible reinforcer while focusing on acclimating the dog to the treats, the system, and, more specifically, treat dispensations.

In one variation of the method S100 shown in FIGS. 6A and 6B, the system dispenses treats at frequencies within the first range of frequencies in Block S112 without overlaying the audible reinforcer. In this implementation, the system can withhold the audible reinforcer during this first period to minimize stimuli presented to the dog in this first period and more slowly introduce the dog to individual variables of the system. Therefore, in this implementation the system can: during the first period, dispense treats at a high frequency with no audible reinforcer; in response to the dog exhibiting less than a threshold caution during dispensation of treats in the first period, initiate a second period of the priming session as discussed below; and dispense treats at a lower frequency with the audible reinforcer at a low volume during this second period.

7.1 Machine Noise Control

However, the loader and dispensers within the system may generate machine noise when loading and dispensing a treat, respectively; and the dog's response to this machine noise may thus far be unknown to the system. Therefore, to reduce possibility that the dog experiences fear or discomfort resulting from the machine during this first period, the system can implement reload and dispense parameters that limit machine noise generated by the system. For example, the system can operate the loader at a fraction of normal operating speed (e.g., 20% of normal operating speed) in order to minimize machine noise during this first period and slowly increase operation speed of the loader over time (e.g., over subsequent periods of the priming session and/or over subsequent training protocols). In another example, the system can dispense treats at a singular, constant azimuthal and altitude position—rather than rotate the dispenser to different azimuthal and/or altitude positions—in order to further limit machine noise generated by the system during this first period of the priming session. Additionally or alternatively, the system can dispense treats within a relatively short distance (e.g., less than two meters) from the system in order to limit sound generated by the dispenser when ejecting a treat into the working field during the first period.

The system can also output the audible reinforcer at a sufficient volume in order to mask machine noise generated by the system. The system therefore can reduce possibility that the dog experiences fear or discomfort resulting from this machine noise by overlaying (or masking) this noise with the audio reinforcer recorded by the user (e.g., a familiar voice).

7.2 Timing

In this implementation, the system can dispense the first set of treats on a substantially consistent interval, such as between three seconds and six seconds—selected pseudo-randomly by the system—between consecutive treats.

Alternatively, the system can dispense the first set of treats: on a fixed time interval (e.g., once per five seconds); or responsive to an action by the dog (e.g., motion toward the last dispensed treat, consumption of the last dispensed treat).

In one example, the system: tracks the dog in the video feed; dispenses a first treat at a first target position relative to dog, such as one meter in front of the dog (or to the left or right side of the dog) and more than one meter from the system; and predicts the current location of the first treat in the working field, such as by detecting the first treat directly in the working field or estimating the location of the first treat based on a ballistics model as described above. Once the system determines that the dog has reached the location of the first treat in the working field, the system can dispense a second treat at a second target position relative to the dog, such as (again) one meter in front of the dog (or to the left or right side of the dog) and more than one meter from the system. In this example, the system can repeat this process for a total of five dispensed treats.

In a similar example, the system dispenses each subsequent treat in this first period of the priming session as the dog approaches the last dispensed treat in order to influence the dog to maintain focus on these treats and to continue moving around the working field despite machine noise generated by the system. Similarly, the system can dispense each subsequent treat in this first period of the priming session as the consumes the last dispensed treat to distract the dog from machine noise generated by the system and to influence the dog to maintain focus on these treats.

In yet another example, the system dispenses a first set of treats at a relatively long distance from the system in order to move the dog to a relatively far position from the system such that the dog is subject to a lower intensity of machine noise generated by the system and such that the dog may perceive the system as less threatening. In this example, the system can then track the dog in the video feed and predict that the dog has consumed the first treat responsive to detecting the dog's nose near the floor at or near the detected or estimated position of the first treat. Once the system thus determines that the dog has consumed the first treat, the system can dispense a second treat at a (slightly) reduced distance from the system (i.e., between the landing position of the first treat and the system) in order to move the dog slightly closer to the system where the dog may perceive greater intensity of machine noise generated by the system. The system can repeat this process throughout the first period of the priming session in order to draw the dog closer to the system; thus, as the dog moves closer to the system and experiences greater intensity of machine noise generated by the system, the system may reward the dog with treats.

7.3 Response to Unconditioned Reinforcer

Block S114 of the method S100 recites estimating a first acclimation score representative of acclimation to dispensation of the first set of primary reinforcers based on motion of the dog detected in the video feed during the first period of the first priming session. Generally, in Block S114, the system can track the dog and the dog's response to the first set of treats dispensed during the first period of the priming session and predict the dog's comfort level with the system and interest in the dispensed treats accordingly.

In one implementation, the system detects dispensed treats directly in the video feed. (Alternatively, the system can implement a ballistic model to predict location of a dispensed treat based on the azimuthal position, altitude, and dispense speed of the dispenser when this treat was ejected by the dispenser.) The system also: tracks the dog globally in the working field; detects and tracks the dog's nose; and predicts that the dog consumed the treat if the dog's nose fell within a minimum distance of the detected (or estimated) location of the dispensed treat. The system repeats this process for each subsequent dispensed treat to quantify the dog's rate of positive response to these dispensed treats.

Furthermore, the system can: track the dog after dispensing a treat to a particular location in the working field; characterize the dog's "eagerness" for this dispensed treat based on the dog's speed and/or animation as the dog moves toward this particular location in the working field; detect flinching or retreat by the dog away from the system or in a direction opposite the treat within a limited period of time (e.g., one second) after a treat is dispensed. The system can thus: predict that the dog exhibits interest in the treat proportional to its speed, animation, or "eagerness" to reach the location of a dispensed treat; and predict that the dog exhibits fear of or discomfort with the system proportional to a degree that the dog flinches or retreats from the system after a treat is dispensed. The system can thus characterize both the dog's interest in the treat and its comfort with the system based on its response immediately after dispensation of treats during the first period of the priming session.

Thus, if the dog retrieves all (or most) of this first set of treats, exhibits more than a threshold minimum "eagerness"

for these treats, and does not (significantly) flinch or retreat away from the system or these treats when dispensed, the system can: predict that the dog exhibits relatively low fear and relatively high comfort with the system; predict that the dog is interested in the dispensed treat; estimate a relatively high acclimation score for the dog during the first period based on these predictions; and, based on this acclimation score exceeding an acclimation threshold, transition to the second period of the priming session, as described below.

7.4 Repetition of the Priming Session, First Period

However, if the system fails to confirm that the dog has moved proximal the landing location of each dispensed treat and/or bent down to a dispensed treat a number of times equal to the number of dispensed treats but does not detect that the dog (significantly) flinched or retreated when these treats were dispensed, the system can: calculate a lower acclimation score for the dog in the first period corresponding to low confidence for consumption of these treats by the dog; and predict that the dog exhibits only moderate comfort with the system and/or low interest in the treats. Accordingly, the system can: prompt the user to remain in the room and/or load a different treat (e.g., a higher-quality treat that the dog may prefer) into the system; and repeat the first period of the priming session, such as including dispensing a next set of treats closer to the dog (e.g., at the dog's front feet).

Furthermore, if the system detects that the dog flinched or retreated away from the system when a treat was dispensed but soon thereafter returned to the detected or estimated location of the treat and consumed the treat, the system—in conjunction with the remote computer system—can predict that the dog exhibits low-to-moderate comfort with the system but relatively high interest in the treat. The system can thus repeat the first period of the priming session: with adjusted reload and dispense settings that further reduce machine noise generated by the system (e.g., slower reload, shorter dispense distances, more time between consecutive dispensation of treats); and/or with treats dispensed at a greater distance from the system in order to further separate the dog's perception of the treat from its experience of discomfort resulting from machine noise generated by the system.

Similarly, if the system detects that the dog moved away from a landing location of a dispensed treat, flinched, or retreated away from the system when a treat was thus dispensed by the system and that the dog did not return to the treat within a minimum duration of time (e.g., 30 seconds), the system—in conjunction with the remote computer system and/or native application—can predict that the dog exhibits relatively high fear and relatively low comfort with the system and insufficient interest in the dispensed treat to overcome this fear and discomfort. Accordingly, the system (or the native dog training application) can prompt the user to comfort the dog and remain in the room, prompt the user to load a higher-quality treat into the system, and then repeat the first period of the priming session with reload and dispense settings that further-reduce machine noise generated by the system and/or that dispense treats at a greater distance from the dog, such as described above.

Therefore, if the dog retrieves fewer than a minimum proportion of the first set of treats, exhibits less than the threshold minimum "eagerness" for these treats, or retreats away from the system when a treat is dispensed, the system can: discern the dog's level fear of and comfort with the system; and discern the dog's level of interest in the dispensed treat. Accordingly, the system can selectively prompt the user to replace treats loaded into the system with an alternate treat. The system then repeats the first period of the priming session described above, such as with different timing, volume levels of the audible reinforcer, and/or actuation parameters to reduce machine noise and/or reduce the dog's effort to retrieve a dispensed treat (e.g., by dispensing treats closer to the dog during this repeat first period of the priming session).

The system can repeat the first period of the priming session: up to a maximum number of (e.g., six) times (including varying timing and dispensation parameters for these subsequent instances of the first period); or until the dog no longer retreats from the system, no longer flinches when the system dispenses a treat, and/or exhibits more interest in these dispensed treats. The system can then transition to executing the second period of the priming session in Block S120.

8. Second Period: Conditioned Reinforcer

Blocks S120 and S122 of the method S100 recite, during a second period of the first priming session, in response to the first acclimation score exceeding a threshold acclimation, dispensing a second set of primary reinforcers into the working field at frequencies within a second range of frequencies less than the first range of frequencies in Block S120 and outputting the audible reinforcer at a second volume greater than the first volume and approximately concurrent with dispensation of the second set of primary reinforcers. In this implementation, the system can slightly lower the frequency of treat dispensations to prepare the dog for much lower frequency treat dispensations implemented during autonomous training sessions. Additionally, the system can increase the volume level of the audible reinforcer. For example, the system can: during the first period, dispense the first set of primary reinforcers within a first range of frequencies of three seconds to six seconds and output the primary reinforcer in a first range of volume levels of zero decibels to fifteen decibels; and, in response to the first acclimation score for the first period exceeding the threshold acclimation, dispense the second set of primary reinforcers within a second range of frequencies of eight seconds to twelve seconds and output the audible reinforcer in a second range of volume levels of thirty decibels to fifty decibels.

In one implementation, the system independently adjusts the frequency of treat dispensations and the volume of the audible reinforcer. In this variation, the system can initially increase the volume of the audible reinforcer during the second period and subsequently decrease the frequency of treat dispensations, or visa versa, to more slowly acclimate the dog to these settings. Alternatively, the system can adjust both settings at the start of the second period if the dog exhibits relatively high comfort and/or interest (e.g., corresponding to a relatively high acclimation score). For example, in response to the first acclimation score during the first period falling below the threshold acclimation but exceeding a baseline acclimation, the system can: during a first phase of the second period of the first priming session, output the audible reinforcer at the second volume level approximately concurrently with dispensation of a first subset of the second set of primary reinforcers at frequencies within the first range of frequencies; estimate a third acclimation score for the dog based on motion of the dog detected in the video feed corresponding to dispensation of the first subset of the second set of primary reinforcers at frequencies within the first range of frequencies; and, during a second phase of the second period of the first priming session, in response to the third acclimation score exceeding the threshold acclimation, output the audible reinforcer at the second volume level approximately concurrently with dispensation of a second subset of the set of primary reinforcers at frequencies within the second range of frequencies.

In another variation in which the system withhold the audible reinforcer during the first period, Blocks S120 and S122 of the method S100 recite, during a second period of the priming session and in response to the dog exhibiting less than a threshold caution during dispensation of the first set of treats: dispensing a second set of treats into the working field; and outputting an audible conditioned reinforcer at a first volume level approximately concurrent with dispensation of the second set of treats. In this variation, the system: dispenses a second set of (e.g., five) treats, such as according to position, timing, and actuation schema described above; while outputting a conditioned reinforcer in the form of an audible prompt (e.g., audible reinforcer) approximately concurrent with these treats. In particular, in order to achieve a substantially seamless transition from the first period to the second period of the priming session, the system can implement position, timing, and actuation schema similar or identical to parameters implemented by the system during the last instance of the first period of the priming session completed by the system to dispense the second set of (e.g., five additional) treats in Block S120. However, just prior to (e.g., 200 milliseconds before) dispensing a treat during this second period, the system also outputs an audible conditioned reinforcer at a low volume, such as at 15 dB. In this variation, the system continues to dispense treats at frequencies within the first range of frequencies, but introduces the audible reinforcer for the first time in the second period. The system can thus train the dog to anticipate arrival of a treat immediately after hearing the conditioned reinforcer and to not fear the conditioned reinforcer.

8.1 Response to Conditioned Reinforcer

Block S124 of the method S100 recites estimating a first acclimation score representing acclimation to dispensation of the first set of primary reinforcers based on motion of the dog detected in the video feed during the first period of the first priming session. The system can implement similar methods as described above during the first period to estimate a second acclimation score for the second period of the first priming session, in order to characterize the dog's response to the second set of primary reinforcers.

In one variation in which the system withholds the audible reinforcer during the first period and initially outputs the audible reinforcer during the second period, Block S124 of the method S100 recites characterizing the response of the dog to dispensation of the second set of treats and the audible conditioned reinforcer based on motion of the dog detected in the video feed during the second period of the priming session. Block S126 of the method S100 recites, in response to the dog exhibiting less than the threshold caution during dispensation of the third set of treats, repeating the second period of the priming session with the audible conditioned reinforcer output at a second volume level greater than the first volume level approximately concurrent with dispensation of a third set of treats.

In one implementation, the system tracks the dog in the video and audio feeds and characterizes the dog's response to dispensed treats and the conditioned reinforcer during the second period as described above. The system can then predict minimal impact of the conditioned reinforcer—at the low volume level—on the dog's fear and comfort level toward the system if the dog's response to dispensed treats is consistent between the first and second periods of the priming session. Similarly, the system can interpret improvement in the dog's response to dispensed treats (e.g., more exuberance to dispensed treats, less flinching or skittishness when a treat is dispensed, no retreat from the system when a treat is dispensed) as: improvement in the dog's comfort with the system; and minimal impact of the conditioned reinforcer—at the low volume level—on the dog's fear and comfort level toward the system.

Thus, responsive to predicting that the dog is minimally affected by the conditioned reinforcer at the low volume level, the system can: repeat this second period of the priming session a second time, including now outputting the conditioned reinforcer at a higher volume level (e.g., 45 dB); and repeat the foregoing process to verify that the dog remains unaffected by the conditioned reinforcer at this increased volume level during this second instance of the second period in Block S126. Given a consistent positive response from the dog, the system can again: repeat this second period of the priming session a third time, including now outputting the conditioned reinforcer at yet a higher volume level (e.g., 55 dB); and repeat the foregoing process to verify that the dog remains unaffected by the conditioned reinforcer at this further-increased volume level during this third instance of the second period in Block S126.

8.2 Repetition of the Priming Session, Second Period

However, if the system detects—in the video and audio feeds recorded during this second period of the priming session—that the dog is less exuberant or more hesitant to retrieve a treat, exhibits greater skittishness around the system, vocalizes, or retreats further from the system during concurrent output of the conditioned reinforcer and the second set of treats compared to the preceding first period of the priming session in which no audible conditioned reinforcer is output by the system, the system can predict that the dog is exhibiting greater fear or discomfort resulting from the conditioned reinforcer. Accordingly, the system can: repeat the second period of the priming session, including outputting the conditioned reinforcer at a lower volume level; and repeat the foregoing process to verify whether the dog's negative response to the conditioned reinforcer has abated.

If the dog's negative response to the conditioned reinforcer has abated as a result of reducing the volume of conditioned reinforcer during this repeat of the second period of the priming session or if the system has repeated this second period of the priming session a maximum number of (e.g., three) times, the system can transition to a higher volume (e.g., 20 dB higher) for the conditioned reinforcer and again repeat this second period of the priming session. The system can therefore repeat the second period of the priming session multiple times, including: at increasing volume levels for the conditioned reinforcer up to a normal operating volume (e.g., 55 dB) if the dog's response to the conditioned reinforcer is positive or unchanged over previous repetitions of this second period of the priming session; or at the same or lower volume levels for the conditioned reinforcer if the dog's response to the conditioned reinforcer is negative.

Once the system has completed a maximum number of repetitions of the second period of the priming session or completed one repetition of the second period of the priming session at the normal operating volume and frequency, the system can transition into the third period of the priming session described below.

9. Third Period: Frequency & Volume Variance

Block S130 of the method S100 recites—during a third period of the first priming session, in response to the second acclimation score exceeding the threshold acclimation, frequencies in the second range of frequencies exceeding the threshold frequency, and the second volume falling below the threshold frequency—dispensing a third set of primary reinforcers into the working field at frequencies within a third range of frequencies less than the second range of frequencies; outputting the audible reinforcer at a third volume greater than the second volume and approximately concurrent with dispensation of the third set of primary reinforcers; and estimating a third acclimation score based on motion of the dog detected in the video feed during the third period of the first priming session. Block S140 of the method S100 further recites—in response to the third acclimation score exceeding the threshold acclimation, frequencies within the third range of frequencies falling below the threshold frequency, and the third volume exceeding the threshold volume—verifying completion of the first priming protocol. Thus, as the dog continues through the first priming protocol and continues to exhibit comfort, confidence, and interest in the system, the system can continue to decrease the frequency of treat dispensations and increase the volume level of the audible reinforcer. Upon reaching a threshold frequency (e.g., 20-30 seconds between dispensations) and a threshold volume (e.g., 50-100 decibels), the system can verify completion of the first priming protocol.

In one variation, Block S130 of the method S100 recites, during a third period of the priming session and in response to the dog exhibiting less than the threshold caution during dispensation of the third set of treats, dispensing a fourth set of treats into the working field at a second frequency less than the first frequency. Generally, in this variation, in Block S130, after completing the second period of the priming session, the system can implement similar methods and techniques to output the conditioned reinforcer—at normal operating volume—approximately concurrent with dispensation of a third set of (e.g., ten) treats but with greater temporal variance between consecutive treats in order to develop—in the dog—a longer-term interest in outputs of the system.

For example, the system can: dispense consecutive treats on an interval between three seconds and six seconds—selected pseudorandomly by the system—during the first and second periods of the priming session in Blocks S110 and S120; and then dispense consecutive treats on an interval between four seconds and ten seconds—again selected pseudorandomly by the system—during the third period of the priming session in Block S130. The system can also: execute a second instance of the third period of the priming session with even longer intervals of ten seconds to 25 seconds between consecutive treats; and then execute yet a third instance of the third period of the priming session with intervals of 25 seconds to 40 seconds between consecutive treats.

In Block S134, the system can continue to implement methods and techniques described above to track the dog, characterize the dog's response to actions executed by the system during the third period of the priming session, and to selectively repeat the third period—such as with shorter intervals between dispensation of consecutive treats—if the dog exhibits decreased interest in the system or retreats from the working field between these consecutive treats.

10. Occasion Setting Stimulus

Furthermore, during these periods of the priming session, the system can activate a light element—such as an LED or other visual display—on the system in order to visually indicate to the dog (and to the user) that the system is active. For example, the system can maintain the light element in an active state continuously throughout the priming session and deactivate the light element upon conclusion of the priming session, thereby training the dog to anticipate positive reward from the system when the light element is active.

(Furthermore, coincident with activation of the light element, the system can output an audio signal—such as a particular acoustic tone, a recorded word or phrase (e.g., "Training timer!"), or a melodic tone sequence—in order to indicate to the dog not currently in visual contact with the system that the system is active. Similarly, coincident with inactivation of the light element, the system can output a different audio signal to signal cessation of system activity.)

Alternatively, the system can activate the light element for a fixed duration (e.g., three seconds) prior to dispensing a treat throughout the priming session. Yet alternatively, the system can activate the light element for: two seconds prior to dispensing a treat during the first period of the priming session; four seconds prior to dispensing a treat during the second period of the priming session; and eight seconds prior to dispensing a treat during the third period of the priming session. However, the system can selectively activate the light element for any other duration or responsive to any other event during the priming session.

11. Multi-Session Acclimation Period

In one variation, the system pauses the priming session if the dog's response to the system during the first, second, and/or additional periods is highly negative or negative and not improving, such as despite automatic reduction in machine noise by the system and increased distance between the dog and treats dispensed by the system.

For example, if the dog continues to retreat from the system and has not approached or consumed the last five treats dispensed by the system, the system can: maintain the light element (i.e., the occasion setting stimulus) in the active state; pause further periods within the priming session and cease dispensation of additional treats; (prompt the user to comfort the dog and direct the dog toward the dispensed treats;) and track the dog in the video feed for up to a threshold wait duration (e.g., one minute). If the system then determines that the dog has approached and (likely) consumed these dispensed treats within this wait duration and if the total duration of the current priming session does not yet exceed a minimum session duration (e.g., five minutes), the system can resume the priming session. However, if more than the threshold wait duration has passed prior to the dog approaching these dispensed treats and if the total duration of the current priming session exceeds the minimum session duration, the system (or the native dog training application) can: prompt the user to comfort the dog; prompt the user to prepare for or schedule another priming session for the dog with the user present; disable the light element; and return to a hibernate mode. Alternatively, if more than the threshold wait duration has passed prior to the dog approaching these dispensed treats but if the total duration of the current priming session has not yet exceeded the minimum session duration, the system can: prompt the user to comfort the dog; resume the priming session; and repeat this process until the minimum session duration has passed.

In one example, the system can pause the first priming session in response to detecting the dog outside of the working field (e.g., beyond a maximum duration). For example, based on the video feed, if the system detects absence of the dog from the working field for a duration of greater than five seconds, the system can pause dispensation of treats and output of the audible reinforcer until the system detects entry of the dog back into the working field. If, however, a maximum duration passes (e.g., 10 seconds, 30 seconds, 1 minute) before the system detects the dog returning to the working field, the system can pause the first priming session and prompt the user to comfort the dog and/or attempt to lure the dog back into the working field.

12. Multiple Priming Sessions

In one variation, the system executes multiple discrete priming sessions with the dog to confirm the dog's readiness for autonomous training with the system. For example, the system can execute three priming sessions with the dog—while the user is present—according to the foregoing protocols, such as once per day for three consecutive days or three times in one day on a four-hour interval. In this example, the system can track the dog's response to dispensed treats, operation of the system, the conditioned reinforcer, and the occasion setting stimulus throughout these priming sessions and characterize the dog's response to these stimuli as described above, such as including: enthusiasm for treats; consumption of treats; repeated interest in treats; absence of flinching or retreat from the system or treats when dispensed; absence of vocalizations indicative of discomfort; absence of flinching or retreat from the system when the conditioned reinforcer is replayed (particularly at the normal operating volume); and/or continued presence near the system over extended durations of time (e.g., up to 40 seconds) after dispensation of and treat and while the light element is active.

Once the system determines that the dog has reached preset minimum thresholds or characteristics for treat enthusiasm, retreat, and/or continued presence between dispensed treats, etc. in Block S140, the system can predict that the dog is sufficiently acclimated to the system and ready for autonomous training without the user present in Block S140. The system (or the native dog training application executing on the user's mobile computing device) can then: communicate to the user that dog is ready for autonomous training; and coordinate with the user to schedule a training session without the user present (e.g., when the user is at work).

In a similar implementation, the system can track the dog's responses to the system's action during a first priming session described above. If the dog's responses fulfill preset minimum thresholds or characteristics for treat enthusiasm, retreat, and/or continued presence between dispensed treats, etc., the system can predict that the dog is sufficiently acclimated to the system when the user is present. Accordingly, the system (or the native dog training application) can: indicate the dog's progress to the user; interface with the user to schedule a next priming session, such as later on the same day or on the next day; and prompt the user to avoid the dog and the system but to remain available during this second scheduled priming session. During this next priming session, the system can: prompt the user to place the dog in a room with the system and to then leave the room; execute a second priming session according to protocols described above; track and characterize the dog's responses to stimuli output by the system as described above; and then verify whether the dog is ready for autonomous training without the user present. If the dog's response during this second priming session is positive and if the system thus determines that the dog is ready for autonomous training by the system without the user present, the system (or the native dog training application) can interface with the user to schedule an autonomous training session between the system and the dog. However, if the dog's response during this second priming session is neutral or moderately less positive than the previous priming session in which the user was present, the system can: determine that the dog is not yet ready for autonomous training by the system without the user present; schedule another priming session without the user present; and implement the foregoing protocols to execute another priming session with the dog and without the user present. Furthermore, if the dog's response during this second priming session is negative or significantly less positive than the previous priming session in which the user was present, the system can: determine that the dog is not yet ready for autonomous training by the system without the user present; schedule another priming session but now with the user once again present; and implement the foregoing protocols to execute another priming session with the dog and the user present.

In this implementation, the system can automatically repeat this protocol—such as for up to three priming sessions with the user present and up to an additional three priming sessions without the user present—to verify that the dog is ready for autonomous training periods without the user present.

In one example implementation, the system executes and completes three identical (e.g., substantially similar) priming protocols before scheduling a first autonomous training session for the dog. The system can execute these three training protocols across multiple (e.g., two, three, five) priming sessions. In addition, the system can set a minimum number of priming sessions (e.g., two) that must be completed by the dog in order to verify acclimation of the dog to the system. Similarly, the system can set a maximum number of priming sessions (e.g., five) in which the dog must complete the three priming sessions.

For example, the system can verify completion of three repetitions of this protocol (or "priming protocol") before verifying acclimation of the dog to the system. In this example, during a first priming session, the system can: initiate and execute a first priming protocol (e.g., according to the protocol described above); and, in response to the dog exhibiting above a threshold comfort with the system, a frequency of treat discharges falling below a threshold frequency (e.g., 30 seconds between treat discharges), and a volume level of the audible reinforcer exceeding a threshold volume (e.g., 100 decibels), verify completion of the first priming protocol. Then, if time remains during the first priming session (e.g., a time limit for the first priming session has not been reached) the system can initiate a second priming protocol (e.g., according to the protocol described above) substantially similar to the first priming protocol. If the dog successfully completes both the first and second priming protocol (e.g., two repetitions of the protocol described above) before expiration of the first priming session, the system can initiate a third priming protocol (e.g., the third repetition of the priming protocol) at a start of a second priming session. If, however, the dog successfully completes the first priming protocol and only a portion of the second priming protocol before expiration of the first priming session, the system can: verify completion of the first priming protocol during the first priming session; and, at the start of the second priming session, re-initiate the second priming protocol. Upon verifying completion of the second priming protocol during the second priming session, the system can initiate the third priming protocol. Upon verification of the third priming protocol during the second priming session, the system can verify completion of the third priming protocol, and verify acclimation of the dog to the system.

13. Dog Response Classification

In the foregoing implementations, as the system tracks the dog during periods within one or more priming sessions, the system can classify the dog based on its responses to stimuli output by the system and then predict a quantity and duration of additional priming sessions—with and without the user present—necessary to achieve a minimum level of comfort for the dog with the system prior to transitioning to autonomous training sessions without the user present.

In one example, the system: records a timeseries of actions and characteristics of the dog during the current priming session; transforms this timeseries into a vector (or other container); and then implements clustering, regression, template matching, deep learning, or other techniques to classify the dog as one of highly enthusiastic, moderately enthusiastic, unenthusiastic but not fearful, or unenthusiastic and fearful based on data contained in this vector. Each of these classes can be associated with a particular quantity and duration of remaining priming sessions—such as with and without the user present—that have historically prepared dogs in this class for autonomous training with the system.

In this example, the remote computer system can maintain and update these classes and corresponding quantities and durations of remaining priming sessions over time based on data collected by deployed systems executing priming sessions with a population of dogs. Thus, the system (or the remote computer system) can leverage these historical acclimation data to: classify the dog; to predict a quantity of and durations of remaining priming sessions to sufficiently acclimate the dog to the system; and then communicate these priming session predictions to the user in order to prepare and coordinate with the user to acclimate the dog to the system. The system can then selectively execute a next priming session—with or without the user—according to the current class of the dog. The system can also reclassify the dog during each acclimation period and then: verify acclimation of the dog; complete the current priming session and schedule a next priming session; and/or terminate the current priming session and schedule a next priming session according to the dog's class.

Alternatively, the system can set a minimum number of (e.g., one, three, five) priming sessions and/or repetitions of the priming protocol required for completion before scheduling autonomous training sessions with the dog. The system can classify the dog's response to stimuli output by the system during priming sessions (e.g., as an acclimation score) and only progress the dog through each priming protocol as described above and executed during these priming sessions as the dog reaches set response thresholds (e.g., acclimation thresholds).

In one implementation, the system can schedule and/or suggest alternate acclimation protocols, such as manual acclimation and auto-acclimation as described below. For example, in response to repeating the first period of the first priming session more than a maximum threshold number of times (e.g., five repetitions), the system can terminate the first priming session and schedule a first auto-acclimation configured to more slowly acclimate the dog to the system in preparation for a second priming session at a later time.

14. Manual Acclimation Session

In one variation described above, before executing the first priming session, the system (or the native dog training application, etc.) can schedule a manual acclimation session with both the user and the dog present, the manual acclimation session configured to prepare the dog for priming sessions and to evaluate the dog's initial response to the system and preparedness for priming sessions. During the manual acclimation session, the system can manually dispense treats in response to inputs received from the user (e.g., via pressing a button of a remote control to the system).

In one implementation, the system can prompt the user to locate the dog and the system in a common space in preparation for a manual acclimation session. Also at this time, the system may prompt the user to review a set of user instructions to train the user regarding appropriate user actions and/or behaviors during the manual acclimation in order to maximize comfort of the dog with the system during this manual acclimation session and future priming sessions. Once the user confirms that she and the dog are ready for the manual acclimation session, the system can: initialize the manual acclimation session, including prompting the user to execute the set of manual acclimation instructions; receive inputs from the user throughout the manual acclimation session and dispense treats accordingly (e.g., in response to these inputs); and, upon termination of the manual acclimation session, evaluate the dog's level of comfort with the system. Based on this evaluation, the system can schedule and/or suggest further acclimation sessions (e.g., manual acclimation session, priming session, auto-acclimation session) for this dog.

For example, after initializing the dog (e.g., before any other acclimation session or autonomous training session), the system can schedule a first manual acclimation session for the dog with the user present. Before initiating the manual acclimation session, the system can provide a set of instructions to the user to aid the user in leading the manual acclimation session, such as: "initially pet/praise the dog to increase the dog's comfort and/or reduce anxiety near the system before initiating any treat dispensation for one minute"; "overlay treat dispensations with the sound of your voice to mask noise generated by the system before and during treat dispensations"; and "once the dog appears comfortable (e.g., wagging tail, no flinching, no barking, etc.), initiate a first treat dispensation by manually depressing the 'dispense' button on the remote." The system can serve further instructions to the user, such as: "wait at least one minute after the first treat dispensation and, if the dog consumed the first treat and appears comfortable in the environment, initiate a second treat dispensation"; "wait at least 45 seconds after the second treat dispensation and, if the dog consumes the second treat and continues to appear comfortable, initiate a third dispensation"; and "continue initiating treat dispensations this way as the dog appears comfortable. As the dog gains confidence in the environment and with the system (e.g., consuming treats, exhibiting confident posture), the user may initiate treat dispensations more rapidly (e.g., decrease a duration between treat dispensations). The user may continue initiating treat dispensations until a frequency of dispensations reaches a minimum threshold frequency or if the dog exhibits low comfort or interest with the system for more than a threshold duration. Alternatively, the system—based on inputs from the user—can execute the manual acclimation session according to a set duration (e.g., 15 minutes) and terminate the manual acclimation session once the set duration is passed.

Additionally and/or alternatively, the system can record (e.g., via recording of a video feed of the working field) a timeseries of characteristics and/or actions of the dog, such as: a first time at which a dispensed treat lands on the floor in the working field; a second time corresponding to an initial action taken by the dog in response to the dispensed treat; a third time at which the dog approaches and/or consumes the treat. The system can extract a set of acclimation metrics from this timeseries of data, such as: a quantity of treats dispensed; an average duration between treats landing on the floor and consumption by the dog during the manual acclimation session; and an average duration between treat dispensations, etc.

Upon completion of the manual acclimation session, the system can evaluate the dog's comfort, confidence, and acclimation with the system based on the dog's interactions with both the user and the system, the dog's posture, and the dog's propensity to consume and/or move toward treats dispensed by the system during the manual acclimation session. The system can characterize the dog's comfort, confidence, and acclimation with the system as a manual acclimation session, based on any acclimation metric or combination of acclimation metrics such as the quantity of dispensations during the manual acclimation session, the average duration between treats landing on the floor and consumption by the dog, and/or other timestamped data collected during the manual acclimation session. Additionally and/or alternatively, the system can output a binary manual acclimation score of "pass" or "fail" based on these acclimation metrics.

Based on this evaluation and/or manual acclimation score, the system can predict whether the dog is prepared (e.g., exhibits above a threshold comfort with the system, manual acclimation score exceeds a threshold acclimation) for a first priming session, and/or suggest an appropriate acclimation protocol for the dog. If the system calculates a relatively high manual acclimation score (e.g., ten treat dispensations) exceeding a threshold acclimation (e.g., three treat dispensations), the system can suggest and/or schedule a first priming session for the dog. However, if the system calculates a relatively low manual acclimation score (e.g., one treat dispensation) for the dog falling below the threshold acclimation, the system can suggest an alternative acclimation protocol configured to more slowly introduce the dog to the system, such as suggesting a first auto-acclimation session as described below.

In one implementation, the system initiates a timer (e.g., for fifteen minutes) at a start of the manual acclimation session. Then, upon expiration of the timer, the system can terminate the manual acclimation session and characterize the dog's acclimation to the system during this manual acclimation session. For example, once the user confirms that she and the dog are ready for the manual acclimation session, the system can: initialize the manual acclimation session, including initiating a timer for a set duration; receive inputs from the user throughout the manual acclimation session and dispense treats accordingly (e.g., in response to these inputs); in response to expiration of the timer, terminate the manual acclimation session; and estimate a manual acclimation score for the dog during the manual acclimation session. Additionally and/or alternatively, the system can: estimate the manual acclimation score after each dispensation during the manual acclimation session; and, in response to the manual acclimation score exceeding a threshold score at any time during the manual acclimation session, terminate the manual acclimation session and schedule and/or suggest a first priming session for the dog. Therefore, by implementing the timer, the system can set a maximum duration for the manual acclimation session in which the dog may demonstrate a threshold comfort or threshold acclimation with the system.

Therefore, the system can execute these manual acclimation sessions—in cooperation with the user—to: increase comfort of the dog with the system including noise output by the system and movement of the system (e.g., the dispenser); prepare the dog for priming sessions and/or auto-acclimation sessions as described below; promote associations between the system and dispensation of treats for the dog; evaluate the dog's initial comfort with the system and/or interest in treats based on data collected (e.g., via video and audio recordings) during the manual acclimation session and/or feedback input by the user; leverage this data collected during the manual acclimation session to assign acclimation protocols best matched to a particular dog in order to achieve success throughout acclimation and eventually autonomous training.

15. Auto-Acclimation Session

Figure 3:
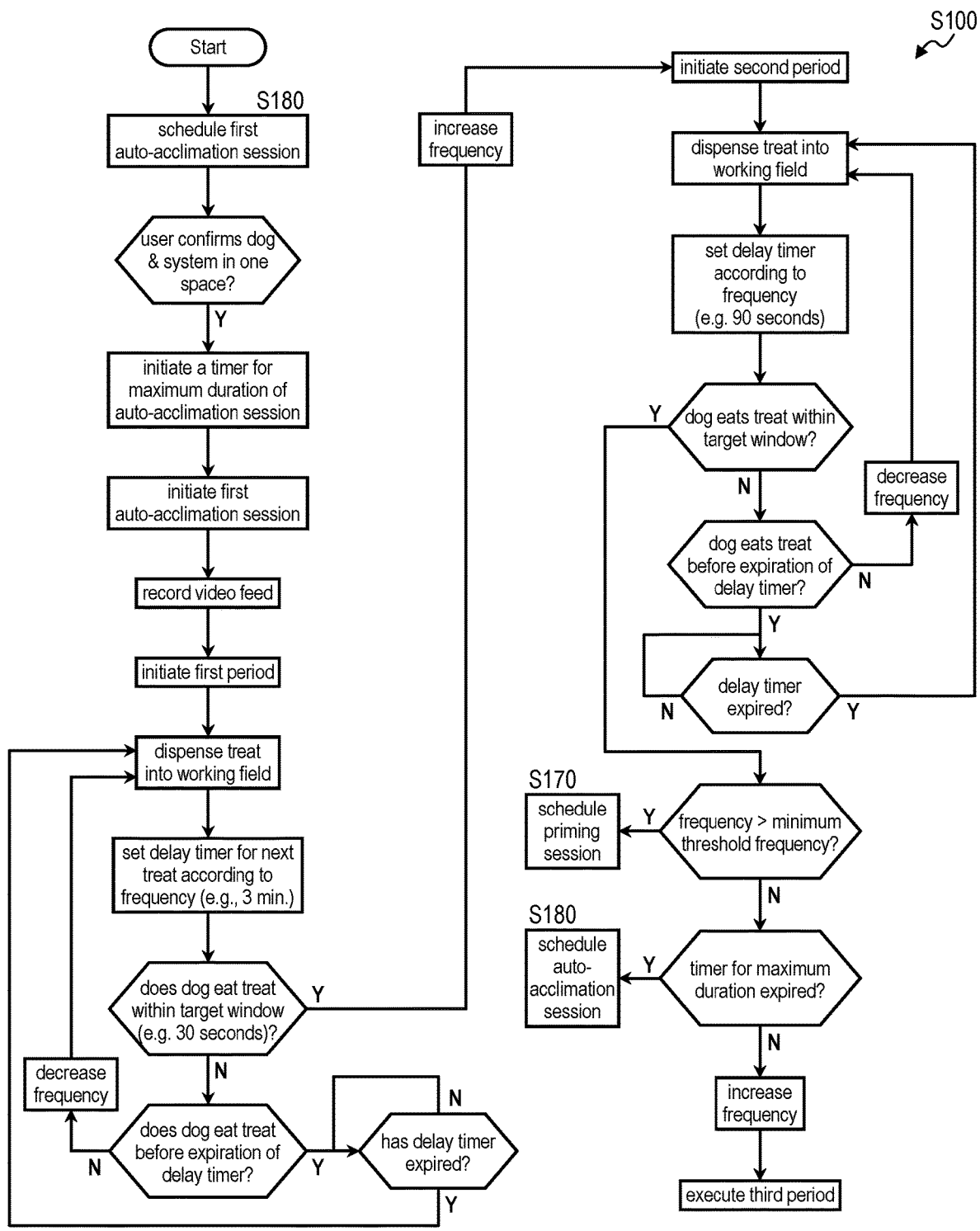
FIG. 3 is a flowchart representation of one variation of the method.

In one variation, as shown in FIG. 3, the system can execute an auto-acclimation session for the dog after a manual acclimation session, the auto-acclimation session configured to further prepare the dog for the first priming session. The system can execute the auto-acclimation session such that the dog is more slowly introduced to the system (e.g., longer durations between treat dispensations, no or quieter audible reinforcer) before exposure to more rapid treat dispensations and increased stimuli during priming sessions. During the auto-acclimation session, the system can dispense treats at a low frequency (e.g., every 30 seconds, every minute, every three minutes) and more slowly acclimate the dog to more frequent dispensations throughout the session, as opposed to a priming session, in which the system dispenses treats at a higher frequency initially and decreases this frequency throughout the priming session.

In one implementation, during an auto-acclimation session, the system can dispense treats at a particular frequency and selectively increase and/or decrease this frequency based on the dog's actions (e.g., movement toward or away from treats, consumption of treats, barking) following each treat dispensation. If the system detects a positive response (e.g., movement towards treats, consumption of treats, no barking, etc.) from the dog indicative of comfort with the system, the system can increase the frequency of treat dispensation (or decrease an interval between treat dispensations). If, however, the system detects a negative response (e.g., movement away from treats, no consumption of treats, barking, flinching, etc.), the system can decrease the frequency of treat dispensation (or increase the interval between treat dispensations). Additionally, the system can continue dispensing treats at the particular frequency if the dog displays a minimum interest in the treats, such as approaching treats slowly or consuming treats after a delay, indicating the dog may display a greater interest in treats in a consecutive treat dispensation. Once the frequency of dispensing treats exceeds an auto-acclimation frequency threshold, the system can verify completion of the auto-acclimation session for the dog and suggest and/or schedule a first priming session or an additional auto-acclimation session(s). Therefore, in this implementation, the system can execute an auto-acclimation session to: ramp up the frequency of treat dispensation to compensate for differences between a preceding manual acclimation session and a succeeding priming session; acclimate the dog to more frequent treat dispensations before introducing the audible reinforcer; and further acclimate the dog to the system before initiating the priming session.

For example, before initiating a first auto-acclimation session, the system can prompt the user to locate the dog and the system in a common space in preparation for the first auto-acclimation session. Once the user confirms that the dog is ready for the auto-acclimation session, the system can confirm that the dog is present in the working field via the video feed. Once confirmed, the system can initialize the auto-acclimation session, including: during a first period of the auto-acclimation session, dispensing a first set of treats into the working field at frequencies within a first range of frequencies (e.g., every three minutes); in response to the dog approaching and/or consuming the first set of treats before a next dispensation but outside of a target window (e.g., 30 seconds), repeating the first period of the auto-acclimation session; during a second period of the auto-acclimation session, in response to the dog approaching and/or consuming the first set of treats within the target window, dispensing a second set of treats into the working field at frequencies within a second range of frequencies (e.g., every 90 seconds) greater than the first range of frequencies; in response to the dog approaching and/or consuming the second set of treats before a next dispensation but outside of the target window, repeating the second period of the auto-acclimation session; and, in response to the dog approaching and/or consuming the second set of treats within the target window, dispensing a third set of treats into the working field at frequencies within a third range of frequencies (e.g., every 45 seconds) greater than the second range of frequencies. Alternatively, in response to the dog ignoring (e.g., not approaching, not consuming) the first set of treats before the next dispensation (e.g., after 3 minutes), the system can dispense the second set of treats into the working field at a frequencies within a fourth range of frequencies (e.g., 3:45 minutes) less than the first range of frequencies.

In one implementation, the system can execute an auto-acclimation session in response to poor acclimation of the dog to the system (e.g., not eating treats, posture indicating discomfort, barking, etc.) during a manual acclimation session preceding the auto-acclimation session. Alternatively, if the dog exhibits comfort and higher acclimation to the system during manual acclimation, the system can skip the auto-acclimation session and suggest and/or schedule a first priming session for the dog after the manual acclimation session. The system can therefore schedule and/or suggest either an auto-acclimation session or a priming session after the initial manual acclimation session based on the dog's manual acclimation score. Thus, the system can: optimize acclimation time for a dog based on an initial screening of the dog's comfort and/or interest with the system during the manual acclimation session; provide additional acclimation time for dogs exhibiting discomfort and/or disinterest with the system in preparation for a priming session; minimize acclimation time for dogs exhibiting comfort and/or interest with the system; and promote balance between boredom and discomfort of the dog by adjusting acclimation training (e.g., auto-acclimation session versus priming session) appropriately for the dog in order to achieve comfort of the dog with the system throughout acclimation.

For example, in response to estimating a manual acclimation score less than a threshold manual acclimation score (e.g., corresponding to fewer than three treat dispensations), the system can schedule a first auto-acclimation session for the dog. Later, once the system receives confirmation from the user that the dog is prepared, the system can initiate and execute the first auto-acclimation session configured to acclimate the dog to more frequent treat dispensations by increasing and/or decreasing the frequency at which treat dispensations occur throughout the session, based on responses of the dog to each treat dispensation. If the system exceeds a minimum frequency threshold during the auto-acclimation session, the system can verify completion of the auto-acclimation session and suggest and/or schedule a first priming session for the dog. If, however, the system does not exceed the minimum frequency threshold during the auto-acclimation session (e.g., before expiration of a set duration for the auto-acclimation session), the system can suggest and/or schedule an additional auto-acclimation session for the dog, and repeat this protocol until the minimum frequency threshold is reached.

15.1 Transitioning Between Auto-Acclimation and Priming Sessions

As shown in FIGS. 3, 4, and 5, once the dog has successfully completed the auto-acclimation session as described above, the system can schedule a first priming session. For example, the system can: execute a first auto-acclimation session; estimate an acclimation score for the first auto-acclimation session; and, in response to the first acclimation score exceeding a threshold acclimation, verify completion of the first auto-acclimation session and schedule a first priming session. Later, when the dog returns for a next session with the system, the system can identify the dog (e.g., via images of the dog collected by the system or RFID tag on the dog's collar); access a dog profile corresponding to the dog; and load the first priming session in response to the dog profile specifying completion of the first auto-acclimation session and the scheduled first priming session.

Alternatively, the system can schedule an additional auto-acclimation session or multiple auto-acclimation sessions for the dog before switching to a first priming session. The system can implement a set number of auto-acclimation sessions (e.g., three) that the dog must complete before switching to priming sessions, or adjust the number of auto-acclimation sessions for the dog based on the manual acclimation score and/or auto-acclimation scores estimated throughout each auto-acclimation session. Upon determining successful completion of these auto-acclimation sessions (e.g., completing the set number of auto-acclimation session, exceeding a threshold auto-acclimation score), the system can schedule a first priming session for the dog and transition to priming.

In one variation, the system can suggest and/or schedule a set of auto-acclimation sessions for the dog after exhibiting poor acclimation (e.g., low comfort, low acclimation scores) with the system during a priming session(s). Thus, the system can transition the dog from priming sessions to auto-acclimation sessions to refocus the dog and/or attempt to improve the dog's comfort and interest in the system and treats. For example, the system can: during a first priming session, in response to exceeding a maximum number of iterations of the second period of the first priming session, repeat the first period of the first priming session; in response to exceeding the maximum number of iterations of the first period of the first priming session, terminate the first priming session; and schedule a first auto-acclimation session for the dog. In this example, if the dog immediately exhibits more comfort and interest with the system during the first auto-acclimation session (e.g., by quickly reaching a minimum frequency threshold), the system can terminate the first auto-acclimation session and transition the dog to a second priming session. If, however, the dog exhibits minimal comfort and interest with the system during the first auto-acclimation session, the system can schedule a second auto-acclimation session. If, after a maximum number of auto-acclimation sessions the dog still exhibits low comfort and/or no interest with the system, then the system can schedule a second manual acclimation session for the dog.

Therefore, the system can transition between different acclimation session types (e.g., priming, manual acclimating, and auto-acclimation) and adjust accordingly throughout this acclimation period to maximize the dog's confidence, interest in treats, and comfort with the system.

16. Scheduling an Autonomous Training Session

Upon verifying acclimation of the dog to the system, the system can schedule a first autonomous training session for the dog. The system can prompt the user to prepare the dog for the first autonomous training session and thereafter execute the first autonomous training session without the user present.

For example, at an end of a priming session, in response to verifying acclimation of the dog to the training apparatus, the system can schedule a first autonomous training session for the dog with the training apparatus. Later, before the scheduled first autonomous training session, the system can: prompt the user to select a training protocol from a set of training protocols; prompt the user to record a first audio clip of the user reciting a voice command associated with a target pose within the training protocol; and access a video feed recorded by an optical sensor during the first autonomous training session, the optical sensor integrated into the training apparatus and defining a field of view intersecting a working field. Then, during the first autonomous training session, the system can: record the video feed of the working field; in the video feed, detect the animal within the working field; while the animal is detected in the working field, play back the first audio clip via an audio driver integrated into the training apparatus; in the video feed, detect a current pose of the animal; calculate a deviation between the current pose of the animal and the target pose; and, in response to the deviation falling within a threshold, play a second audio clip comprising a secondary reinforcer and dispense a first unit of a primary reinforcer via the dispenser integrated into the training apparatus.

The systems and methods described herein can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a user computer or mobile device, wristband, smartphone, or any suitable combination thereof. Other systems and methods of the embodiment can be embodied and/or implemented at least in part as a machine configured to receive a computer-readable medium storing computer-readable instructions. The instructions can be executed by computer-executable components integrated by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor but any suitable dedicated hardware device can (alternatively or additionally) execute the instructions.

As a person skilled in the art will recognize from the previous detailed description and from the figures and claims, modifications and changes can be made to the embodiments of the invention without departing from the scope of this invention as defined in the following claims.

We claim:

1. A method for acclimating a dog to autonomous training sessions with a training apparatus, comprising:
    during a first priming session:
        accessing a video feed of a working field adjacent the training apparatus via an optical sensor integrated into the training apparatus; and
        detecting the dog in the video feed;
        during a first period of the first priming session, initiating a first priming protocol, in a set of priming protocols, comprising:
            dispensing a first set of primary reinforcers into the working field at frequencies within a first range of frequencies via a dispenser integrated into the training apparatus; and
            characterizing a first acclimation level of the dog during dispensation of the first set of primary reinforcers based on behaviors of the dog detected in the video feed during the first period;
        during a second period of the first priming session, in response to the first acclimation level exceeding a threshold acclimation:
            dispensing a second set of primary reinforcers into the working field at frequencies within a second range of frequencies less than frequencies within the first range of frequencies; and
            characterizing a second acclimation level of the dog during dispensation of the second set of primary reinforcers based on behaviors of the dog detected in the video feed during the second period; and
        in response to the second acclimation level of the dog exceeding the threshold acclimation and frequencies within the second range of frequencies falling below a threshold frequency, verifying completion of the first priming protocol.

2. The method of claim 1, further comprising, in response to verifying completion of each priming protocol, in the set of priming protocols, verifying acclimation of the dog to the training apparatus.

3. The method of claim 2, further comprising, in response to verifying acclimation of the dog to the training apparatus:
    scheduling a first autonomous training session for the dog with the training apparatus;
    generating a prompt to select a training protocol, from a set of training protocols, for the first autonomous training session;
    transmitting the prompt to a user associated with the dog;
    in response to the user selecting a first training protocol, in the set of training protocols:
        generating a prompt to record a first audio clip of the user reciting a voice command associated with a target pose within the first training protocol; and
        transmitting the prompt to the user; and
    during the first autonomous training session:
        accessing a second video feed of the working field recorded by the optical sensor;
        detecting the animal within the working field in the second video feed;
        playing back the first audio clip via an audio driver integrated into the training apparatus;
        detecting a current pose of the animal;
        characterizing a deviation between the current pose and the target pose; and
        in response to the deviation falling within a threshold deviation:
            playing a second audio clip comprising a secondary reinforcer; and
            dispensing a first unit of the primary reinforcer via the dispenser.

4. The method of claim 2:
further comprising:
    during the first priming session:
        at a start of the first priming session, initiating a timer;

in response to verifying completion of the first priming protocol, initiating a second priming protocol; and in response to expiration of the timer, terminating the first priming session; and during a second priming session succeeding the first priming session by a set duration, in response to verifying completion of the first priming protocol and the second priming protocol, initiating a third priming protocol; and wherein verifying acclimation of the dog to the training apparatus in response to verifying completion of each priming protocol, in the set of priming protocols, comprises verifying acclimation of the dog to the training apparatus in response to verifying completion of the first priming protocol, the second priming protocol, and the third priming protocol.

5. The method of claim 1:

further comprising:

during the first period, outputting an audible reinforcer at a first volume level approximately concurrent with dispensation of the first set of primary reinforcers; and during the second period, in response to the first acclimation level exceeding the threshold acclimation, outputting the audible reinforcer at a second volume level, greater than the first volume level, approximately concurrent with dispensation of the second set of primary reinforcers; and wherein verifying completion of the first priming protocol in response to the second acclimation level of the dog exceeding the threshold acclimation and frequencies within the second range of frequencies falling below the threshold frequency comprises verifying completion of the first priming protocol in response to the second acclimation level of the dog exceeding the threshold acclimation, frequencies within the second range of frequencies falling below the threshold frequency, and the second volume level exceeding a threshold volume.

6. The method of claim 5, further comprising:

during a first phase of the second period of the first priming session, in response to the first acclimation score falling below the threshold acclimation and exceeding a baseline acclimation:

dispensing a first subset of primary reinforcers, in the second set of primary reinforcers, at frequencies within the first range of frequencies;

outputting the audible reinforcer at the second volume level approximately concurrent with dispensation of the first subset of primary reinforcers; and characterizing a third acclimation level of the dog during dispensation of the first subset of primary reinforcers based on behaviors of the dog detected in the video feed; and during a second phase of the second period of the first priming session, in response to the third acclimation level exceeding the threshold acclimation:

dispensing a second subset of primary reinforcers, in the second set of primary reinforcers, at frequencies within the second range of frequencies; and outputting the audible reinforcer at the second volume level approximately concurrently with dispensation of the second subset of the set of primary reinforcers.

7. The method of claim 5:

wherein dispensing the first set of primary reinforcers at frequencies within the first range of frequencies comprises dispensing the first set of primary reinforcers at frequencies between once per three-second interval to once per six-second interval;

wherein outputting the audible reinforcer at the first volume level comprises outputting the audible reinforcer at the first volume level between zero decibels and fifteen decibels;

wherein dispensing the second set of primary reinforcers at frequencies within the second range of frequencies comprises dispensing the second set of primary reinforcers at the frequencies between once per eight-second interval to once per twelve-second interval; and wherein outputting the audible reinforcer at the second volume level comprises outputting the audible reinforcer at the second volume level between thirty decibels and fifty decibels.

8. The method of claim 5, further comprising, during a third period of the first priming session, in response to the second acclimation level falling below the threshold acclimation:

dispensing a third set of primary reinforcers into the working field at frequencies within the second range of frequencies;

outputting the audible reinforcer at the second volume and approximately concurrently with dispensation of the third set of primary reinforcers; and characterizing a third acclimation level of the dog based on behaviors of the dog detected in the video feed during the third period of the first priming session.

9. The method of claim 8, further comprising, during a fourth period of the first priming session, in response to the third acclimation score falling below the threshold acclimation, initiating the first priming protocol.

10. The method of claim 5, further comprising, in response to verifying completion of the first priming protocol:

during a third period of the first priming session, initiating a second priming protocol, in the set of priming protocols, comprising:

dispensing a third set of primary reinforcers into the working field at frequencies within a third range of frequencies;

outputting the audible reinforcer at a third volume level approximately concurrent with dispensation of the third set of primary reinforcers; and characterizing a third acclimation level of the dog during dispensation of the third set of primary reinforcers based on behaviors of the dog detected in the video feed during the third period; and during a fourth period of the first priming session, in response to the third acclimation level exceeding the threshold acclimation:

dispensing a fourth set of primary reinforcers into the working field at frequencies with a fourth range of frequencies less than the third range of frequencies;

outputting the audible reinforcer at a fourth volume level greater than the third volume level approximately concurrent with dispensation of the third set of primary reinforcers;

characterizing a fourth acclimation level of the dog during dispensation of the fourth set of primary reinforcers based on behaviors of the dog detected in the video feed during the fourth period; and in response to the fourth acclimation level exceeding the threshold acclimation and frequencies in the fourth range of frequencies falling below the threshold frequency, verifying completion of the second priming protocol.

11. The method of claim 10:
wherein dispensing the third set of primary reinforcers at frequencies within the third range of frequencies comprises dispensing the third set of primary reinforcers at frequencies within the third range of frequencies approximately equal to the first range of frequencies;
wherein outputting the audible reinforcer at the third volume comprises outputting the audible reinforcer at the third volume approximately equal the first volume;
wherein dispensing the fourth set of primary reinforcers at frequencies within the fourth range of frequencies comprises dispensing the fourth set of primary reinforcers at frequencies within the fourth range of frequencies approximately equal the second range of frequencies; and
wherein outputting the audible reinforcer at the fourth volume comprises outputting the audible reinforcer at the fourth volume approximately equal the second volume.

12. The method of claim 1:
further comprising, during the first priming session, accessing an audio feed recorded via an audio sensor integrated into the training apparatus;
wherein characterizing the first acclimation level based on behaviors of the dog recorded in the video feed during the first period comprises characterizing the first acclimation level based on motion of the dog recorded in the video feed and sounds of the dog recorded in the audio feed during the first period; and
wherein characterizing the second acclimation level based on behaviors of the dog recorded in the video feed during the second period comprises characterizing the second acclimation level based on motion of the dog recorded in the video feed and sounds of the dog recorded in the audio feed during the second period.

13. The method of claim 1:
wherein dispensing the first set of primary reinforcers into the working field comprises:
dispensing a first primary reinforcer, in the first set of primary reinforcers, toward a first target location in the working field, the first target location located a first distance from the training apparatus; and
dispensing a second primary reinforcer, in the set of primary reinforcers, toward a second target location in the working field, the second target location located a second distance less than first target distance from the training apparatus; and
wherein dispensing the second set of primary reinforcers into the working field comprises:
dispensing a third primary reinforcer, in the second set of primary reinforcers, toward a third target location coextensive the second target location in the working field; and
dispensing a fourth primary reinforcer, in the second set of primary reinforcers, toward a fourth target location located within a target radius of the third target location in the working field.

14. The method of claim 1, further comprising:
during a third period of the first priming session, in response to the second acclimation level of the dog exceeding the threshold acclimation and frequencies in the second range of frequencies exceeding the threshold frequency:
dispensing a third set of primary reinforcers into the working field at frequencies within a third range of frequencies less than frequencies within the second range of frequencies; and
characterizing a third acclimation level of the dog during dispensation of the third set of primary reinforcers based on behaviors of the dog detected in the video feed during the third period; and
in response to the third acclimation level exceeding the threshold acclimation and frequencies within the third range of frequencies falling below the threshold frequency, verifying completion of the first priming protocol.

15. The method of claim 1, wherein characterizing the first acclimation level comprises:
accessing an animal model linking behaviors of dogs to comfort and interest of dogs with training apparatuses;
characterizing an interest level of the dog in the first set of primary reinforcers based on the animal model and behaviors of the dog detected in the video feed following dispensation of the first set of primary reinforcers;
characterizing a comfort level of the dog with dispensation of the first set of primary reinforcers based on the animal model and behaviors of the dog detected in the video feed during the first period; and
characterizing the first acclimation level based on the interest level and the comfort level.

16. The method of claim 1, further comprising:
during the second period of the first priming session, in response to the first acclimation level falling below the threshold acclimation:
dispensing the second set of primary reinforcers into the working field at frequencies within the first range of frequencies; and
characterizing the second acclimation level based on behaviors of the dog detected in the video feed during the second period; and
during a third period of the first priming session, in response to the second acclimation level exceeding the threshold acclimation and in response to the first acclimation level falling below the threshold acclimation:
dispensing a third set of primary reinforcers into the working field at frequencies within the second range of frequencies;
characterizing a third acclimation level of the dog based on behaviors of the dog detected in the video feed during the third period; and
in response to the third acclimation level exceeding the threshold acclimation and frequencies within the second range of frequencies falling below the threshold frequency, verifying completion of the first priming protocol.

17. The method of claim 1, further comprising, during a period of time preceding the first priming session:
prompting a user associated with the dog to remain in a space with the dog and the training apparatus;
prompting the user to review a set of user instructions to train the user for participation in a manual acclimation session;
during the manual acclimation session:
initiating a timer for a set duration;
tracking a count of inputs received from the user;
in response to receiving a user input, in a set of user inputs, triggering dispensation of primary reinforcer into the working field; and
in response to expiration of the timer, terminating the manual acclimation session;

characterizing a manual acclimation level of the dog for the manual acclimation session based on the count; and in response to the manual acclimation level exceeding a manual acclimation threshold, scheduling the first priming session.

18. The method of claim 17, further comprising, in response to the manual acclimation level falling below the manual acclimation threshold:

scheduling an auto-acclimation session for the dog;

prompting the user to locate the dog and the training apparatus in the space in preparation for the auto-acclimation session;

during the auto-acclimation session:
  accessing the video feed of the working field; and
  detecting the dog in the video feed;

during a first period of the auto-acclimation session, dispensing a third set of primary reinforcers into the working field at frequencies within a third range of frequencies; and during a second period of the auto-acclimation session:
  in response to the dog exhibiting a negative response to the third set of primary reinforcers, dispensing a fourth set of primary reinforcers at frequencies within a fourth range of frequencies less than the third range of frequencies;
  in response to the dog exhibiting a positive response to the third set of primary reinforcers within a target duration, dispensing the fourth set of primary reinforcers at frequencies within a fifth range of frequencies exceeding the third range of frequencies;
  in response to the dog exhibiting a positive response to the third set of primary reinforcers outside of the target duration but before a next dispensation, dispensing the fourth set of primary reinforcers at frequencies within the third range of frequencies; and
  in response to the dog exhibiting the positive response to the third set of primary reinforcers within the target duration and frequencies within the third range of frequencies exceeding a minimum frequency threshold, verifying completion of the auto-acclimation session.

19. The method of claim 18, further comprising:

in response to verifying completion of the auto-acclimation session, scheduling the first priming session; and during the first priming session, in response to repeating the first period of the first priming session more than a threshold number of attempts, terminating the first priming session and scheduling a second auto-acclimation session.

20. A method for acclimating a dog to autonomous training sessions with a training apparatus, comprising:

during a priming session:
  accessing a video feed of a working field adjacent the training apparatus via an optical sensor integrated into the training apparatus; and
  detecting the dog in the video feed;

during a first period of the priming session:
  dispensing a first set of primary reinforcers into the working field at a first frequency via a dispenser integrated into the training apparatus; and
  characterizing acclimation of the dog during dispensation of the first set of primary reinforcers based on behaviors of the dog detected in the video feed during the first period of the priming session;

during a second period of the priming session and in response to the dog exhibiting more than a threshold acclimation during dispensation of the first set of primary reinforcers:
  dispensing a second set of primary reinforcers into the working field and outputting an audible conditioned reinforcer at a first volume level approximately concurrent with dispensation of the second set of primary reinforcers;
  characterizing acclimation of the dog during dispensation of the second set of primary reinforcers and the audible conditioned reinforcer based on behaviors of the dog detected in the video feed during the second period of the priming session; and in response to the dog exhibiting more than the threshold acclimation during dispensation of the second set of primary reinforcers:
  dispensing a third set of primary reinforcers into the working field at a second frequency less than the first frequency and outputting the audible conditioned reinforcer at a second volume level approximately concurrent with dispensation of the third set of primary reinforcers; and
  characterizing acclimation of the dog during dispensation of the third set of primary reinforcers and the audible conditioned reinforcer based on behaviors of the dog detected in the video feed during the second period; and in response to the dog exhibiting more than the threshold acclimation during dispensation of the third set of primary reinforcers, verifying acclimation of the dog to the training apparatus.

* * * * *